(12) United States Patent
Kaida

(10) Patent No.: US 11,016,437 B2
(45) Date of Patent: May 25, 2021

(54) IMAGE FORMING APPARATUS THAT CONTROLS REGULATION UNIT TO SWITCH REGULATING STATE OF A DETACHABLE REPLACEMENT

(71) Applicant: CANON KABUSHIKI KAISHA, Tokyo (JP)

(72) Inventor: Yoshiteru Kaida, Numazu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/598,644

(22) Filed: Oct. 10, 2019

(65) Prior Publication Data

US 2020/0133197 A1    Apr. 30, 2020

(30) Foreign Application Priority Data

Oct. 26, 2018 (JP) .............................. JP2018-202043

(51) Int. Cl.
| | | |
|---|---|---|
| *G03G 15/08* | (2006.01) | |
| *G03G 21/18* | (2006.01) | |
| *G03G 21/16* | (2006.01) | |
| *G03G 15/00* | (2006.01) | |

(52) U.S. Cl.
CPC ..... *G03G 21/1839* (2013.01); *G03G 15/5004* (2013.01); *G03G 15/5016* (2013.01); *G03G 15/5033* (2013.01); *G03G 15/556* (2013.01); *G03G 21/1633* (2013.01); *G03G 21/1647* (2013.01); *G03G 21/1878* (2013.01); *G03G 2221/1654* (2013.01); *G03G 2221/1869* (2013.01); *G03G 2221/1892* (2013.01)

(58) Field of Classification Search
USPC ........................................................ 399/111
See application file for complete search history.

(56) References Cited

U.S. PATENT DOCUMENTS

| | | | |
|---|---|---|---|
| 8,190,039 B2 | 5/2012 | Iida | |
| 8,238,789 B2 * | 8/2012 | Seorl | G03G 21/1633 399/116 |
| 8,437,648 B2 | 5/2013 | Tachibana | |
| 10,025,263 B2 | 7/2018 | Hatazaki | |

(Continued)

FOREIGN PATENT DOCUMENTS

| | | |
|---|---|---|
| JP | 2005-91462 | 4/2005 |
| JP | 2007-22030 | 2/2007 |

(Continued)

*Primary Examiner* — Q Grainger
(74) *Attorney, Agent, or Firm* — Venable LLP

(57) ABSTRACT

The image forming apparatus includes a cartridge replaceable by detachably mounting to the image forming apparatus, a door that takes a closed state or an open state, a locking pin that switches a state of the regulation unit between a regulating state in which the replacement unit is prevented to be detached from the image forming apparatus and a release state in which the replacement unit is to be detachable from the image forming apparatus, and a lock control unit (a control unit) that makes a determination as to whether or not the state of the regulation unit is to be switched from the release state to the regulating state, at a predetermined timing when initial processing is completed after a power source is turned on or a state of the door becomes the closed state from the open state.

20 Claims, 17 Drawing Sheets

(56) References Cited

U.S. PATENT DOCUMENTS

| | | | |
|---|---|---|---|
| 2006/0067733 A1* | 3/2006 | Kawasumi | G03G 21/1853 |
| | | | 399/111 |
| 2009/0041481 A1 | 2/2009 | Iida | |
| 2010/0215407 A1* | 8/2010 | Funada | G03G 21/1623 |
| | | | 399/258 |
| 2010/0329704 A1 | 12/2010 | Tachibana | |
| 2011/0076055 A1* | 3/2011 | Lee | G03G 21/1647 |
| | | | 399/110 |
| 2015/0323894 A1* | 11/2015 | Hikichi | G03G 15/6541 |
| | | | 399/88 |
| 2017/0219994 A1 | 8/2017 | Hatazaki | |
| 2019/0302685 A1* | 10/2019 | Abe | G03G 21/1647 |

FOREIGN PATENT DOCUMENTS

| | | |
|---|---|---|
| JP | 2009-42691 | 2/2009 |
| JP | 2011-8142 | 1/2011 |
| JP | 2016-90647 | 5/2016 |

\* cited by examiner

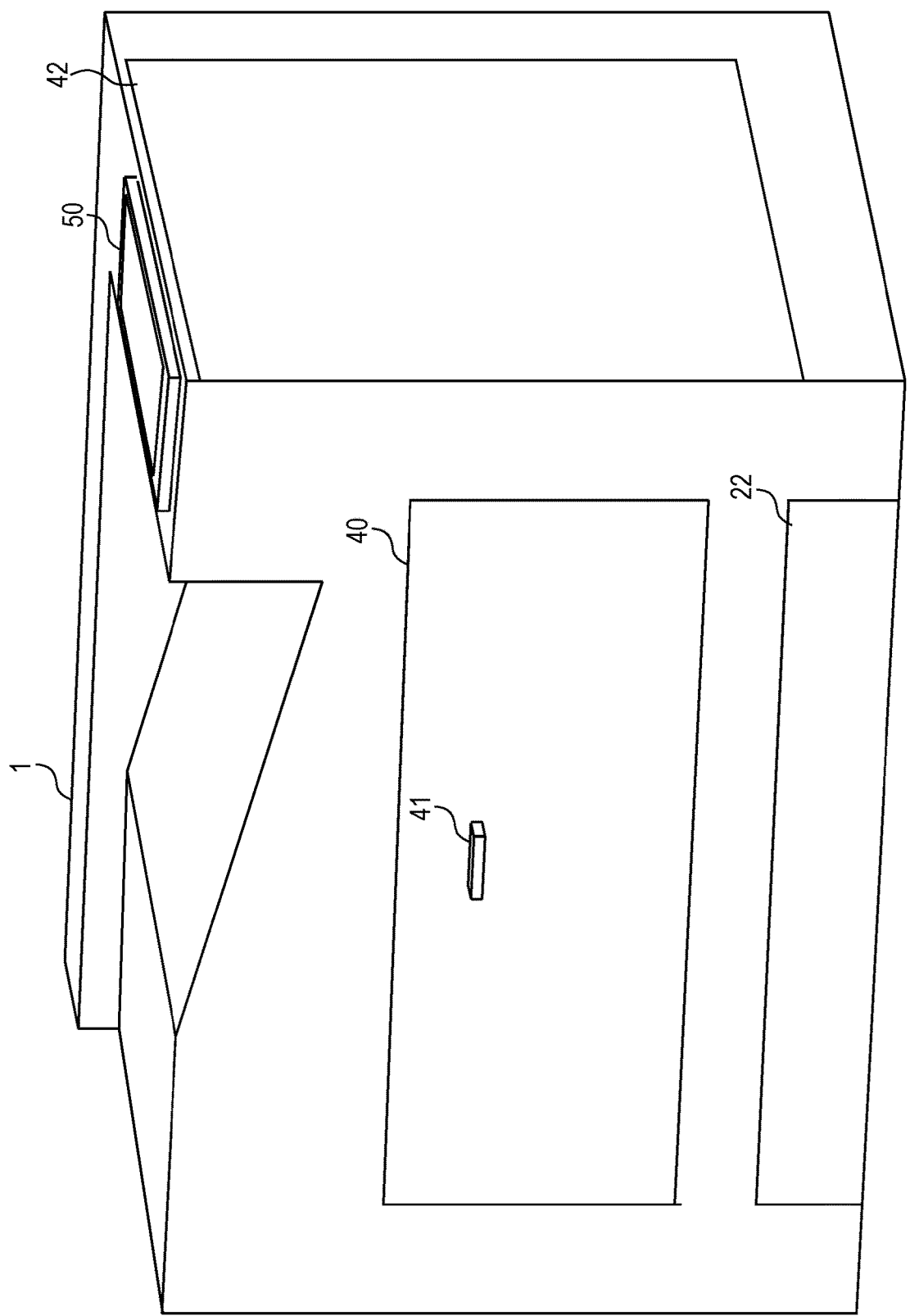

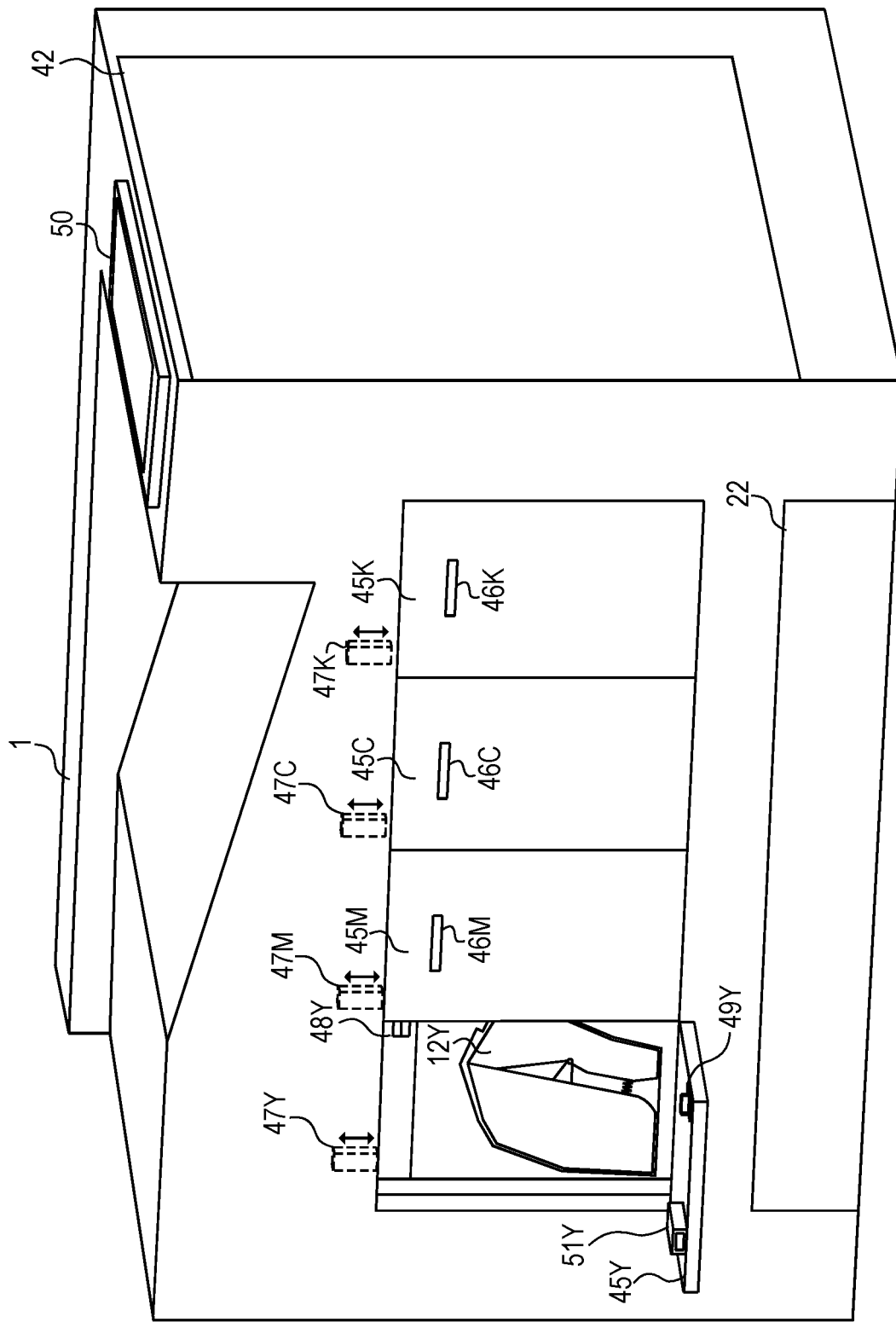

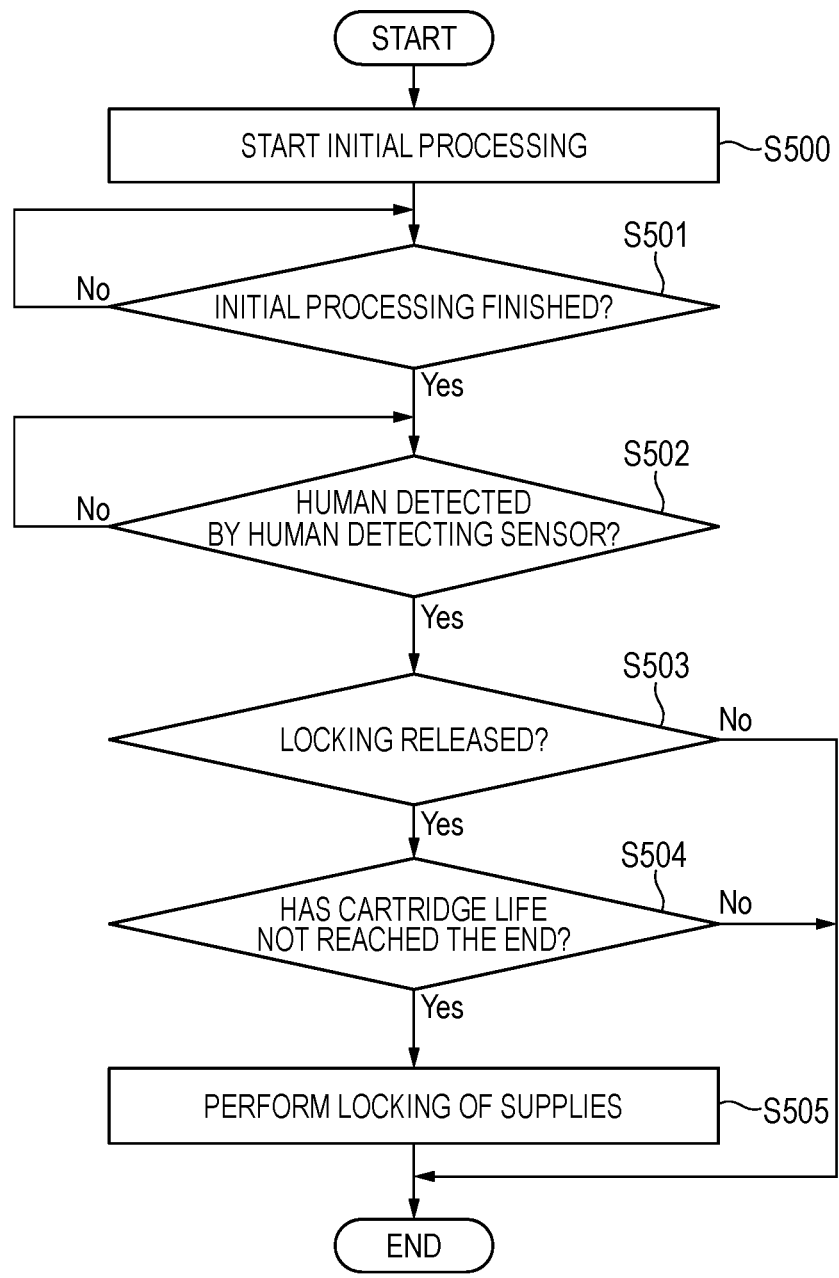

IMAGE FORMING APPARATUS THAT CONTROLS REGULATION UNIT TO SWITCH REGULATING STATE OF A DETACHABLE REPLACEMENT

BACKGROUND OF THE INVENTION

Field of the Invention

The present invention relates to an electrophotographic or electrostatic-recording image forming apparatus, for example a copier or a printer.

Description of the Related Art

In a conventional color image forming apparatus, light beams emitted from optical devices independently scan respective photoconductors, on which development units then form toner images of respective colors. The toner images of the respective colors formed on the photoconductors are layered on an intermediate transfer belt to be eventually transferred onto a sheet, or layered on a transfer member on the belt to be eventually transferred onto a sheet. This tandem scheme is conventionally used to form color images. Some tandem-type color image forming apparatuses employ process cartridges; each is an integrated cartridge containing an image forming unit, including a photoconductor and a toner image forming unit such as a development unit. The integrated process cartridges are arranged in a row removably from the image forming apparatus body. For an image forming apparatus having such process cartridges, a user may replace any of the process cartridges without relying on a serviceman, for example when the cartridge runs out of a developer. This allows image forming to be continued, and also improves maintainability because other supplies such as a photoconductor can be replaced at the same time.

With environmental considerations, various techniques for image forming apparatuses have been proposed for finishing up a process cartridge that includes a toner container. For example, a technique has been disclosed in which, only when the right time to replace a process cartridge is detected, a stopper for the process cartridge is disabled (released) to allow the process cartridge to be removed (for example, Japanese Patent Application Laid-Open No. 2005-091462). A technique has also been disclosed that uses a locking unit for locking the cover of a toner container, and a unit for detecting the out-of-toner state of the toner container (for example, Japanese Patent Application Laid-Open No. 2011-008142). In this configuration, at the occurrence of the out-of-toner state of the toner container, the cover of the toner container can be unlocked by a user operation to allow the toner container to be replaced.

Further, a configuration has been disclosed in which if an error is detected, a cover is automatically opened for permitting access to the erroneous location and the user is explicitly notified of the erroneous location (for example, Japanese Patent Application Laid-Open No. 2007-022030). In this configuration, after processing for recovering from the error is performed, the user is explicitly notified if processing following the error-recovery processing has not been completed.

Thus, with environmental considerations, the cartridges are locked by a locking mechanism provided for inhibiting the replacement of the cartridges until the toner in the cartridges is used up, and the user cannot easily release this locking mechanism. However, such a configuration has the following problems.

When the user replaces a cartridge that has reached the life end with a new cartridge, the user may erroneously shut (hereinafter also referred to as "close") the cover of a toner container during the replacement operation. Conventionally, the locking mechanism is set immediately after the cover is closed. Then the user, trying to reopen the cover of the toner container for continuing the replacement operation, will require complicated operations for releasing the lock mechanism.

For example, when the user closes the cover after removing the cartridge that has reached the life end and inserting a new cartridge, a paper sheet may get caught between the apparatus body and the cover by accident. The locking mechanism is then set immediately after the cover is closed, and the user needs to perform complicated unlocking operations for opening the cover and removing the sheet. For example, the user may need to operate an operation panel many times or may possibly ask a serviceman to come. Similar problems may occur in apparatuses in which a locking mechanism should be released for replacing supplies.

SUMMARY OF THE INVENTION

An aspect of embodiments of the present invention is an image forming apparatus that improves usability in replacing supplies.

Another aspect of embodiments of the present invention is an image forming apparatus for forming an image on a recording material, including a replacement unit replaceable by detachably mounting to the image forming apparatus, an open-close unit configured to be in a closed state in which the replacement unit is prevented to be accessed or in an open state in which the replacement unit is to be accessed, a regulation unit configured to switch a state of the regulation unit between a regulating state in which the replacement unit is prevented to be detached from the image forming apparatus and a release state in which the replacement unit is to be detachable from the image forming apparatus, and a determination unit configured to make a determination as to whether or not the state of the regulation unit is to be switched from the release state to the regulating state, wherein the determination by the determination unit is made at a predetermined timing when initial processing is completed after a power source is turned on or a state of the open-close unit becomes the closed state from the open state.

Further features of the present invention will become apparent from the following description of exemplary embodiments with reference to the attached drawings.

BRIEF DESCRIPTION OF THE DRAWINGS

FIG. 2 is a perspective view illustrating a door configuration in the first embodiment.

FIG. 7 is a perspective view illustrating a door lock configuration when a door is open in the second embodiment.

FIG. 17 is a flowchart illustrating a determination process for locking in a fifth embodiment.

DESCRIPTION OF THE EMBODIMENTS

Preferred embodiments of the present invention will now be described in detail in accordance with the accompanying drawings.

First Embodiment

[Image Forming Apparatus]

Figure 1:
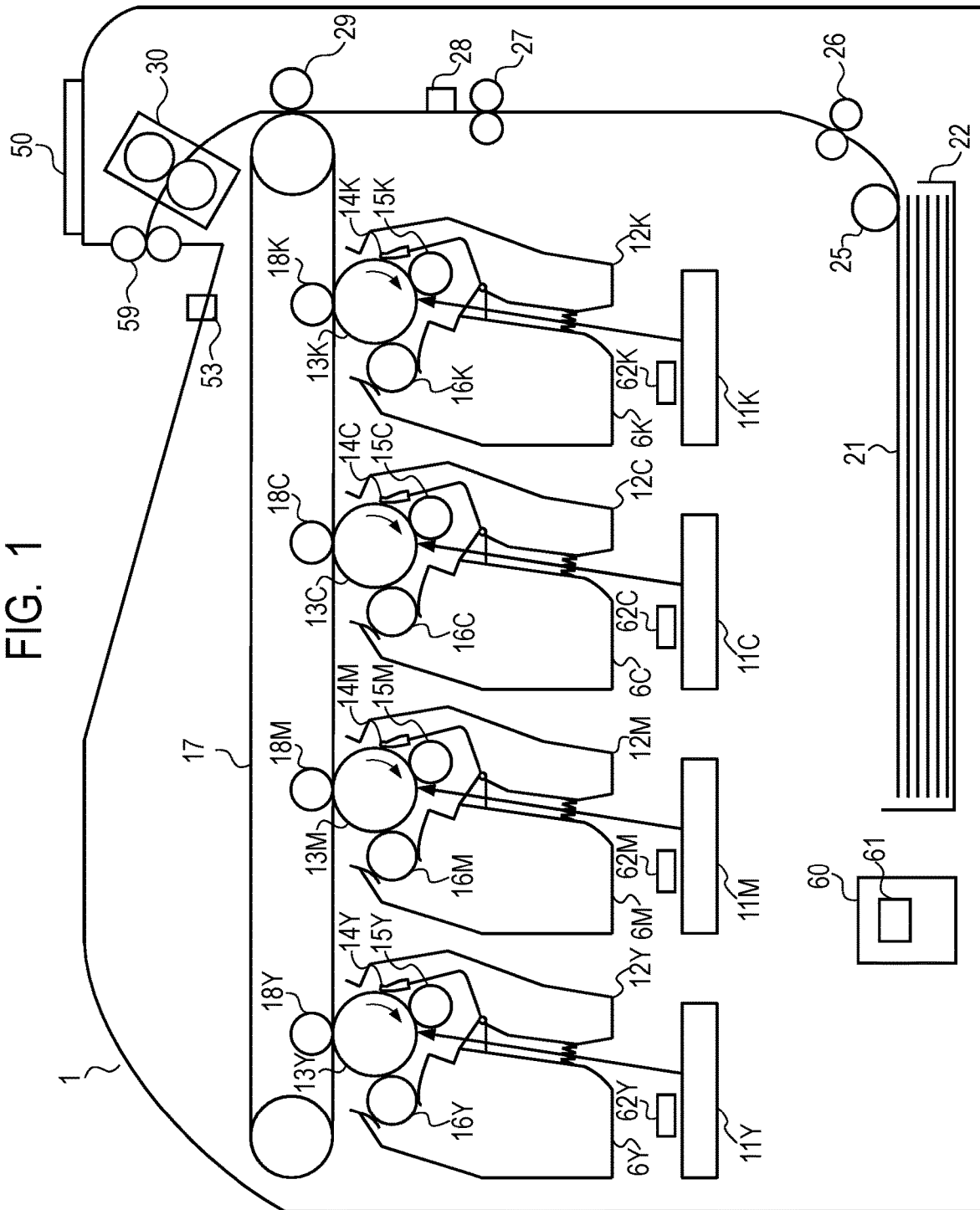
FIG. 1 is a configuration diagram generally illustrating a color image forming apparatus in first to fifth embodiments.

FIG. 1 is a configuration diagram generally illustrating a tandem-type color image forming apparatus in a first embodiment. The tandem-type color image forming apparatus is configured to be able to output full-color images by layering four colors of toner: yellow (Y), magenta (M), cyan (C) and black (K). The indices Y, M, C and K of reference signs represent the respective colors. It is to be noted that the indices Y, M, C and K of the reference signs will be omitted except where members of a particular color are described. A laser scanner 11 and a cartridge 12 are provided for image forming of each color. The cartridge 12 includes a photosensitive drum 13 that rotates in the direction of an arrow in FIG. 1, as well as a drum cleaner 14, a charge roller 15, and a development roller 16 that are provided to contact the photosensitive drum 13, and a toner container 6 containing toner to be supplied to the development roller 16. An intermediate transfer belt 17 is provided in contact with the photosensitive drums 13 of the four colors, and primary transfer rollers 18 are provided to face the respective photosensitive drums 13 with the intermediate transfer belt 17 in between. Sheets 21, which are recording materials, are held in a cassette 22. Provided on the conveyance path of the sheets 21 are a sheet feed roller 25, conveyance rollers 26, and registration rollers 27. A registration sensor 28 is provided near the registration rollers 27 on the downstream side in the conveyance direction of the sheets 21. A secondary transfer roller 29 is provided to contact the intermediate transfer belt 17, and a fixing device 30 and ejection rollers 59 are provided downstream of the secondary transfer roller 29 in the conveyance direction. An ejected sheet sensor 53 is provided near the ejection rollers 59.

An electrophotography process will now be described. The surface of the photosensitive drum 13 is uniformly charged by the charge roller 15 at a dark place in each cartridge 12. The surface of the photosensitive drum 13 is then irradiated by the laser scanner 11 with laser light modulated according to image data, so that the charges in the portions irradiated with the laser light are removed. An electrostatic latent image is thus formed on the surface of the photosensitive drum 13. The development roller 16 applies charged toner to the electrostatic latent image to form a toner image of the corresponding color on the surface of the photosensitive drum 13. The toner image formed on the surface of each photosensitive drum 13 is sequentially transferred in layers by the primary transfer roller 18 onto the intermediate transfer belt 17.

Meanwhile, a sheet 21 in the cassette 22 is fed by the sheet feed roller 25 and conveyed to the registration rollers 27 via the conveyance rollers 26. The toner images on the intermediate transfer belt 17 are then transferred by the secondary transfer roller 29 onto the sheet 21 conveyed via the registration rollers 27. Finally, the unfixed toner images on the sheet 21 are fixed by the fixing device 30, and the ejection rollers 59 eject the sheet 21 out of the image forming apparatus. The ejected sheet sensor 53 for detecting the presence or absence of a sheet ejected from the ejection rollers 59 is provided near the ejection rollers 59.

A body 1 has a control substrate 60, toner remaining amount detection units 62 serving as remaining amount detection units, and a display unit 50. The control substrate 60 includes a control unit 61, which is a control unit for controlling the body 1. The control unit 61 is responsible for the overall control of operation of the body 1, such as control of driving sources for conveying the sheets 21 and control related to image forming. The control unit 61 has a memory unit (not shown), in which machine type information is stored in advance, for example before shipment from the factory. The toner remaining amount detection units 62Y, 62M, 62C and 62K are units for detecting the amounts of toner remaining in the toner containers 6Y, 6M, 6C and 6K. The display unit 50 is a display device for notifying a user of information from the body 1. The display unit 50 may be an operation panel for example, which is capable of receiving input of information in addition to displaying information.

[Cartridge Insertion Configuration]

Figure 3A:
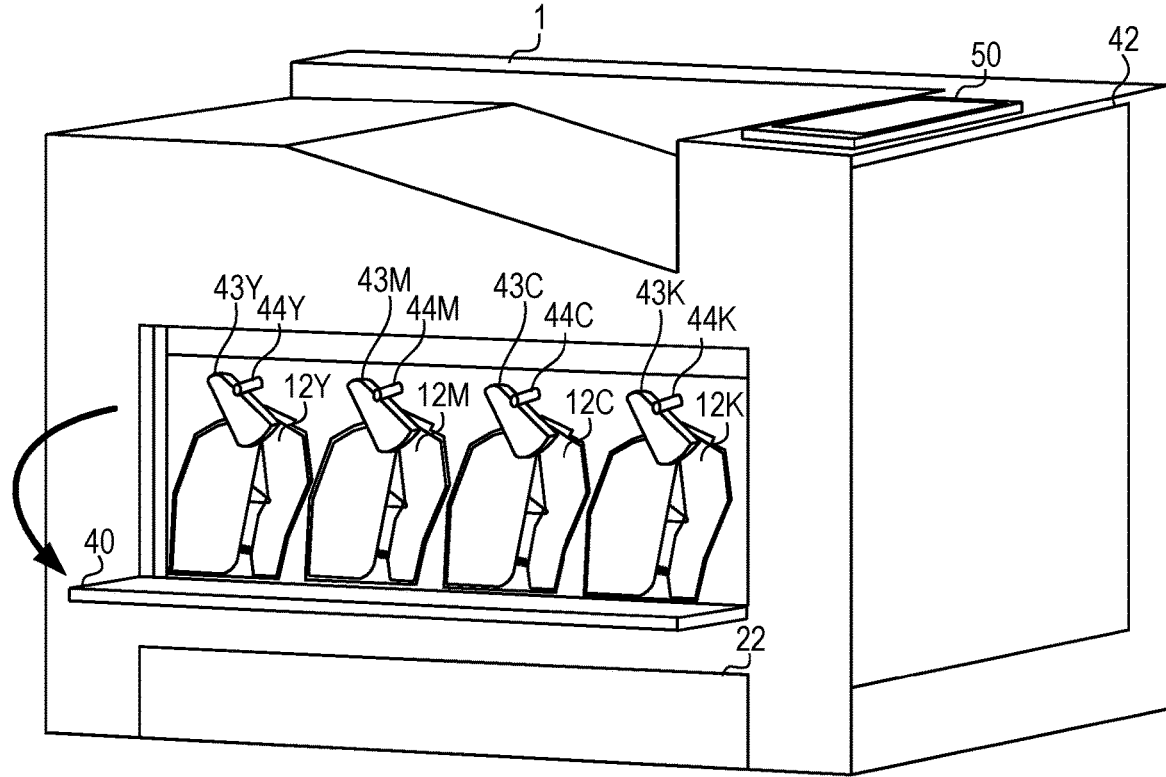
FIGS. 3A and 3B are perspective views when a door is open in the first embodiment.
Figure 3B:
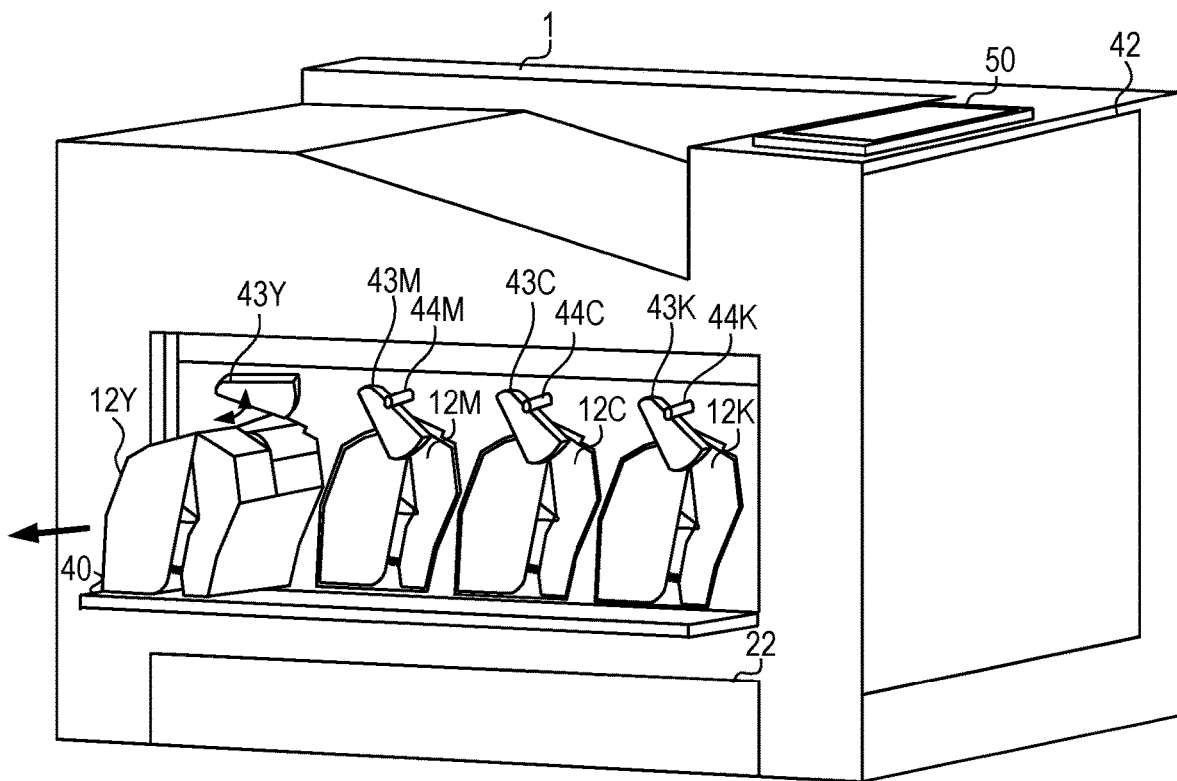

The insertion configuration of the cartridges 12 in the first embodiment will now be described with reference to FIGS. 2, 3A and 3B. FIGS. 2, 3A and 3B are schematic perspective views of a printer, which is the image forming apparatus in which the cartridges 12 can be detachably mounted onto the body 1. Each cartridge 12 is an example of a replacement unit replaceable by detachably mounted onto the body 1 of the image forming apparatus; a new replacement unit is inserted into the body 1 and continually used, and eventually replaced at the time when replacement is needed (hereinafter referred to as the life end). Replacement of a unit may be needed when predetermined image quality cannot be maintained any more in image forming with that replacement unit. FIG. 2 shows a state in which a door 40 as a first door is closed (close state); the first door 40 covers and uncovers an opening provided on the body 1 for replacement of the cartridges 12. Here, the door 40 as an open-close unit is a door for accessing the cartridges 12 for removing the cartridges 12 from inside the body 1. An operation member 41 is a member operated by the user to open and close the door 40. A door 42 as a second door is a door for accessing the sheet conveyance path, such as for performing jam handling for eliminating stagnating sheets 21 at the occurrence of a paper jam during conveyance of the sheets 21.

FIG. 3A is a diagram when the door 40 is open (open state). From the state of FIG. 2, operating the operation member 41 to move the door 40 in the direction indicated by an arrow in FIG. 3A uncovers the section of the door 40. Here, locking members 43Y, 43M, 43C and 43K are members for locking the removal of the respective cartridges 12Y, 12M, 12C and 12K. Locking pins 44Y, 44M, 44C and 44K, which are regulation units, are pins for restricting the positions of the respective locking members 43Y, 43M, 43C and 43K, which are also regulation units. Each locking pin 44 can be switched between the protruding state and the retracting state by a solenoid (not shown). In the protruding state, the locking pin 44 protrudes frontward from the image forming apparatus beyond the locking member 43. In the retracting state, the locking pin 44 is behind the locking member 43. Here, when the locking pin 44 is in the protruding state, the locking member 43 is fixed in the position of a regulating state (hereinafter referred to as the locked state) in which the cartridge 12 is locked so as not to be removed (removal inhibited). This prevents the user from removing the cartridge 12.

FIG. 3B is a diagram showing the locking pin 44Y in the retracting state. In this state, the locking member 43Y can be pivotably moved to a position (hereinafter referred to as a removable position) where the locking member 43Y allows the cartridge 12 to be removed (removable). In FIG. 3B, the yellow cartridge 12Y is in a release state (hereinafter referred to as the unlocked state) in which the cartridge 12Y is unlocked. The user can remove the cartridge 12Y from the body 1 by pulling out the cartridge 12Y in the direction indicated by a dark arrow in FIG. 3B. As shown in FIG. 3A, in this configuration, only opening the door 40 does not allow the cartridge 12 to be removed from the body 1. As shown in FIG. 3B, when the door 40 is open and the locking pin 44 is in the retracting state, the cartridge 12 can be removed in the frontward direction (the arrow direction) from the image forming apparatus.

The locking pin 44Y is controlled by the control unit 61 to be described below. The control unit 61 is configured to switch between a state in which the removal of the cartridge 12 is allowed (hereinafter referred to as removal allowed) and a state in which the removal is inhibited (hereinafter referred to as removal inhibited).

[Control Configuration]

Figure 4:
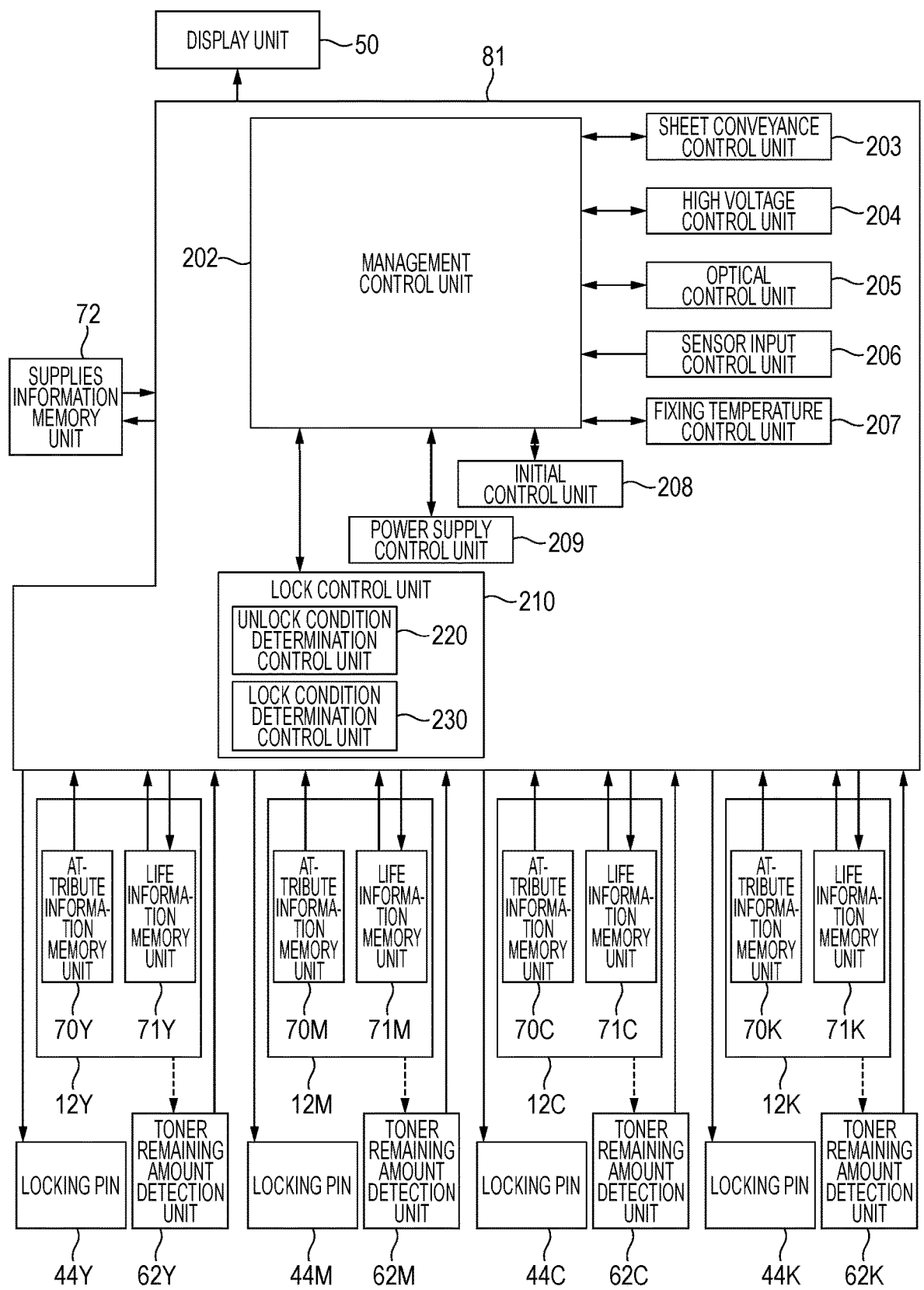
FIG. 4 is a block diagram illustrating a control configuration in the first embodiment.

FIG. 4 is a block diagram of a control configuration. The control unit 61 includes components such as a CPU and is responsible for management of information about the cartridges 12, management of the lives of the cartridges 12, and control of switching between locking and unlocking. A management control unit 202 has a one-chip microcomputer (not shown) including ROM and RAM, and controls management of operations of printer-engine components. A sheet conveyance control unit 203, according to instructions from the management control unit 202, drives the sheet feed roller 25 for feeding the sheets 21 and rotates and stops the conveyance rollers 26 for conveying the sheets 21. A high voltage control unit 204, according to instructions from the management control unit 202, controls output of each of high voltages for charging, development and transfer. An optical control unit 205, according to instructions from the management control unit 202, drives and stops a scanner motor (not shown) included in each laser scanner 11 and causes the laser to flash. A sensor input control unit 206 outputs information (detection results) detected by the registration sensor 28 and the ejected sheet sensor 53 to the management control unit 202. A fixing temperature control unit 207 controls the temperature of the fixing device 30 to a temperature specified by the management control unit 202. An initial control unit 208 performs recovery processing (initial processing to be described later) immediately after power-on or after emergency shutdown. The initial control unit 208 performs processing such as detecting the state of each cartridge 12, detecting remaining sheets (to be described later), and cleaning the intermediate transfer belt 17. A power supply control unit 209 supplies or cuts off necessary power for each control unit upon power-on, upon power-off, upon moving to power-saving state (to be described later), or upon returning from power-saving state. A lock control unit 210 manages information about the cartridges 12 and manages the lives of the cartridges 12. The lock control unit 210 further has a lock condition determination control unit 230 and an unlock condition determination control unit 220. The lock condition determination control unit 230 determines whether a condition for locking is satisfied and locks the supplies. The unlock condition determination control unit 220 determines whether a condition for unlocking is satisfied and unlocks the supplies. The lock control unit 210, having the lock condition determination control unit 230 and the unlock condition determination control unit 220, functions as a determination unit that determines whether to lock or not, or whether to unlock or not.

Each cartridge 12 has an attribute information memory unit 70 that stores supplies attribute information, and a life information memory unit 71 that stores supplies life information. The supplies attribute information is information such as the serial number uniquely assigned to the cartridge 12, for example. The supplies life information is information indicating the life of the cartridge 12, for example. The attribute information memory unit 70 and the life information memory unit 71 are connected to a lock control unit 210 of the control unit 61 upon insertion of the cartridge 12 into the body 1.

A supplies information memory unit 72, which is a first memory unit, is a nonvolatile memory unit residing in the body 1 for storing the content of the attribute information memory unit 70 and the life information memory unit 71. The supplies information memory unit 72 is used to detect the replacement of the cartridge 12. The display unit 50 is used to notify the user of the state of the printer (for example, that the printer is ready for printing or that a cartridge 12 has reached the life end) and to notify the user of information about the operation of replacing a cartridge 12. The display unit 50 also has a touch-panel function, for example, so that the user can input or set certain information by touching predetermined parts on a screen displayed on the display unit 50.

[Supplies Attribute Information and Supplies Life Information]

Table 1 illustrates the content stored in the attribute information memory unit 70Y, which is a second memory unit. Table 2 illustrates the content stored in the life information memory unit 71Y, which is also a second memory unit. In each of the Tables 1 and 2, the first column contains items and the second column contains values for the respective items. The attribute information memory unit 70Y stores the serial number (hereinafter denoted as the serial No.) unique to the cartridge 12, machine type information about an image forming apparatus in which the cartridge 12 is to be used, and cartridge color information indicating the color of the cartridge 12. This stored content is never updated by the control unit 61 (more specifically, the lock control unit 210). For example, the attribute information memory unit 70Y for yellow stores the serial No. "12345," the type information "LBPXXXX," and the cartridge color information "Y"

TABLE 1

| Item | Value |
| --- | --- |
| Serial No. | 12345 |
| Machine type | LBPXXXX |
| Cartridge color information | Y |

The life information memory unit 71Y stores the life end rotation time for determining the life end of the photosensitive drum 13Y, and the total rotation time of the photosensitive drum 13Y. The total rotation time of the photosensitive drum 13Y is accumulated as the photosensitive drum 13 rotates during the operation of the image forming apparatus, and updated accordingly. The control unit 61 uses the values of the life end rotation time and the total rotation time to calculate the remaining life of the photosensitive drum 13Y in terms of rotation time. For example, Table 2 stores 10000 sec (seconds) and 6000 sec for the life end rotation time and the total rotation time of the photosensitive drum 13Y, respectively. The amount of usage in % is therefore 6000/10000×100=60%, so that the life left for the photosensitive drum 13Y (hereinafter referred to as the remaining life) is 40% (=100%-60%).

TABLE 2

| Item | Value |
| --- | --- |
| End-of-life rotation time of photosensitive drum 13Y | 10000 sec |
| Total rotation time of photosensitive drum 13Y | 6000 sec |
| End-of-life rotation distance of photosensitive drum 13Y | 5000 m |
| Total rotation distance of photosensitive drum 13Y | 3500 m |
| Remaining amount in toner container 6Y | 25% |
| Remaining amount for unlocking cartridge 12Y | 5% |

The life information memory unit 71Y also stores the life end rotation distance for determining the life end of the photosensitive drum 13Y, and the total rotation distance of the photosensitive drum 13Y. The total rotation distance of the photosensitive drum 13Y is accumulated as the photosensitive drum 13 rotates during the operation of the image forming apparatus, and updated accordingly. The control unit 61 uses the values of the life end rotation distance and the total rotation distance to calculate the remaining life of the photosensitive drum 13Y in terms of rotation distance. For example, Table 2 stores 5000 m (meters) and 3500 m for the life end rotation distance and the total rotation distance of the photosensitive drum 13Y, respectively. The amount of usage in % is therefore 3500/5000×100=70%, so that the remaining life of the photosensitive drum 13Y is 30% (=100%-70%).

The remaining amount in the toner container 6Y in Table 2 indicates the amount of toner remaining in the toner container 6Y detected by the toner remaining amount detection unit 62Y, and the value is stored as detected. In a typical technique, the amount of remaining toner is calculated by accumulating the number of pixels of images formed by the relevant one of the laser scanners 11Y, 11M, 11C and 11K. Other techniques may also be used to determine the amount of remaining toner. Among the three remaining amounts (remaining lives) of the cartridge 12Y based on Table 2 (i.e., the remaining life determined with the total rotation time, the remaining life determined with the total rotation distance, and the remaining amount of toner), the amount with the smallest value is regarded as the remaining amount of the cartridge 12Y. This remaining life with the smallest value among the three remaining lives will be hereinafter referred to as the shortest life information.

In the example of Table 2, the remaining life is determined as 40% from the total rotation time, 30% from the total rotation distance, and 25% from the amount of remaining toner. Accordingly, the control unit 61 regards the remaining life (the shortest life information) of the cartridge 12Y as 25%. In this manner, the control unit 61 obtains the shortest life information from the remaining lives determined in the different units based on the values stored in the life information memory unit 71 of the cartridge 12, and regards the obtained shortest life information as the remaining life of the cartridge 12. In the first embodiment, the remaining life of the cartridge 12 is thus determined based on the multiple pieces of information, specifically the total rotation time, the total rotation distance, and the amount of remaining toner. Alternatively, the remaining life of the cartridge 12 may be determined based on one piece of information, specifically any one of the total rotation time, the total rotation distance, and the amount of remaining toner. Other information correlated with the remaining life of the cartridge 12 may also be used.

The remaining amount for unlocking the cartridge 12Y (hereinafter referred to as the remaining amount for unlocking) in Table 2 is a set value for the remaining amount for releasing the locking mechanism, such that the locking mechanism is released if the remaining amount of the cartridge 12Y falls to or less than that value (hereinafter referred to as a set value for the remaining amount). If the remaining life of the cartridge 12Y falls to or less than the remaining amount for unlocking, the control unit 61 releases the locking mechanism. In the example of Table 2, the control unit 61 releases the locking mechanism if the shortest life information falls to or less than 5%. The other colors are also addressed in the same manner and therefore will not be described. This manner of unlocking by the control unit 61 (i.e., determining the time to replace the cartridge 12 based on the shortest life information and the remaining amount for unlocking and then releasing the locking mechanism) will hereinafter be referred to as release of the locking mechanism.

[Supplies Information Memory Unit]

Table 3 illustrates information stored in the supplies information memory unit 72. The supplies information memory unit 72 stores information selected from the information stored in the memory units (70, 71) of the cartridge 12 of each color. Here, the serial No. for comparison, the lock state of the locking mechanism, and the shortest life information are stored.

TABLE 3

| | Item | Value |
| --- | --- | --- |
| Y | Serial No. | 12345 |
| | Lock state | Locked |
| | Shortest life information | 25% |
| M | Serial No. | 67890 |
| | Lock state | Locked |
| | Shortest life information | 25% |
| C | Serial No. | 98765 |
| | Lock state | Locked |
| | Shortest life information | 25% |
| K | Serial No. | 55555 |
| | Lock state | Locked |
| | Shortest life information | 25% |

In Table 3, the first column contains the colors, the second column contains items for each color, and the third column contains values for the respective items. For example, for yellow (Y), the serial No. has information, for example "12345," read from the attribute information memory unit 70Y. The lock state has information about the control of the locking mechanism performed by the control unit 61 ("locked" or "unlocked"), which is here set to "locked" for example. Further, the shortest life information has information, for example "25%," read from the life information memory unit 71Y.

[Control to Set and Release Locking Mechanism During Image Forming]

Figure 5:
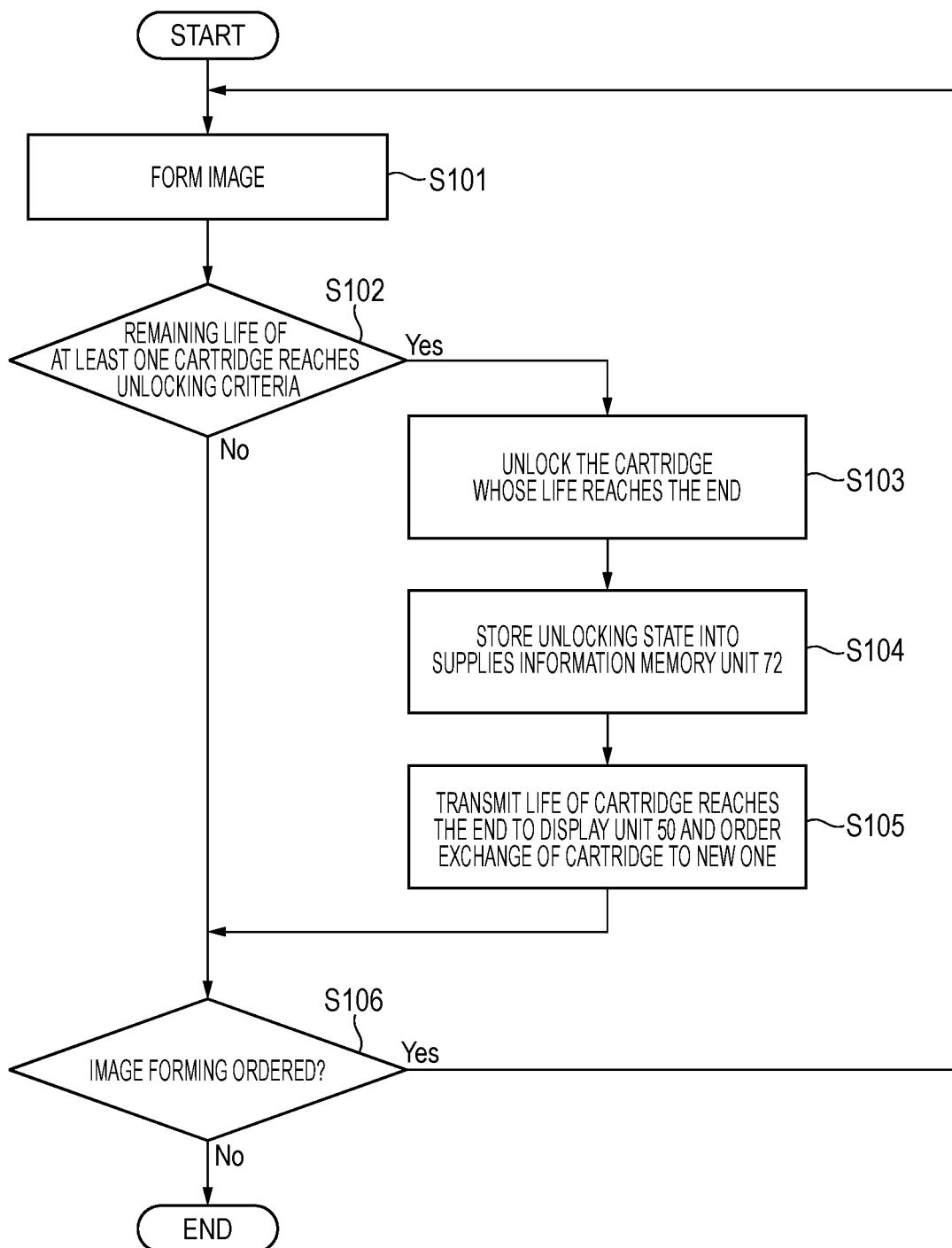
FIG. 5 is a flowchart illustrating an unlocking process in the first embodiment.

The method of handling the locking mechanism by the control unit 61 will now be described with reference to the flowcharts in FIGS. 5 and 6. The flowchart in FIG. 5 illustrates the process flow of the release of the locking mechanism, in which the locking mechanism is released if the remaining life of at least one cartridge 12 falls to or less than the remaining amount for unlocking (falls to or less than a predetermined value) during image forming.

Upon receiving an image forming designation, the control unit 61 starts the process beginning in step (hereinafter denoted as S) 101. In S101, the control unit 61 forms an image. In S102, during or after the image forming, the control unit 61 refers to the information in Table 2 stored in each life information memory unit 71 by the lock control unit 210 to determine whether or not the remaining life of at least one cartridge 12 reaches the criterion for releasing the locking mechanism. Here, if the remaining life of a cartridge 12 reaches the criterion for releasing the locking mechanism, it means that the cartridge 12 reaches the life end. If the control unit 61 determines in S102, through the lock control unit 210, that the remaining life reaches the criterion, the control unit 61 advances the process to S103. If the control unit 61 determines in S102, through the lock control unit 210, that the remaining life does not reach the criterion, the control unit 61 advances the process to S106. For example, for the yellow cartridge 12Y, the control unit 61 determines by the lock control unit 210 that the remaining life is 25% from the shortest life information in Table 3 and that the criterion is 5% from the remaining amount for unlocking in Table 2. The lock control unit 210 compares these percentages and determines that the yellow cartridge 12Y does not reach the criterion. In S103, for the cartridge 12 determined by the lock control unit 210 as having the remaining life reaching the criterion for releasing the locking mechanism, the control unit 61 releases the locking mechanism by causing the corresponding locking pin 44 to retract. For example, if the remaining life of the yellow cartridge 12Y is equal to or less than the remaining amount for unlocking 5%, the lock control unit 210 causes the locking pin 44Y for yellow to retract.

In S104, for the lock state of the cartridge 12 determined by the lock control unit 210 as reaching the life end, the control unit 61 stores information indicating the unlocked state (for example, "unlocked") in Table 3 in the supplies information memory unit 72. In S105, the control unit 61 causes the display unit 50 to display the following information. That is, the control unit 61 provides display of a notification of the life end of the cartridge 12 and a prompt (such as a replacement attention) to replace the dead cartridge 12 with a new one (hereinafter referred to as a new cartridge), and advances the process to S106. In S106, the control unit 61 determines whether or not a further image forming designation is received. If the control unit 61 determines that a further image forming designation is received, the control unit 61 returns the process to S101, if the control unit 61 determines that a further image forming designation is not received, the control unit 61 terminates the process.

Thus, the cartridge 12 is unlocked if the remaining life of the cartridge 12 falls to or less than a predetermined amount. This prevents incurring unnecessary cost by erroneously replacing the still alive cartridge 12 with another cartridge, for example a new cartridge.

[Process of Determining Whether to Set Locking Mechanism Upon Power-on or Upon Door-Closing]

Figure 6:
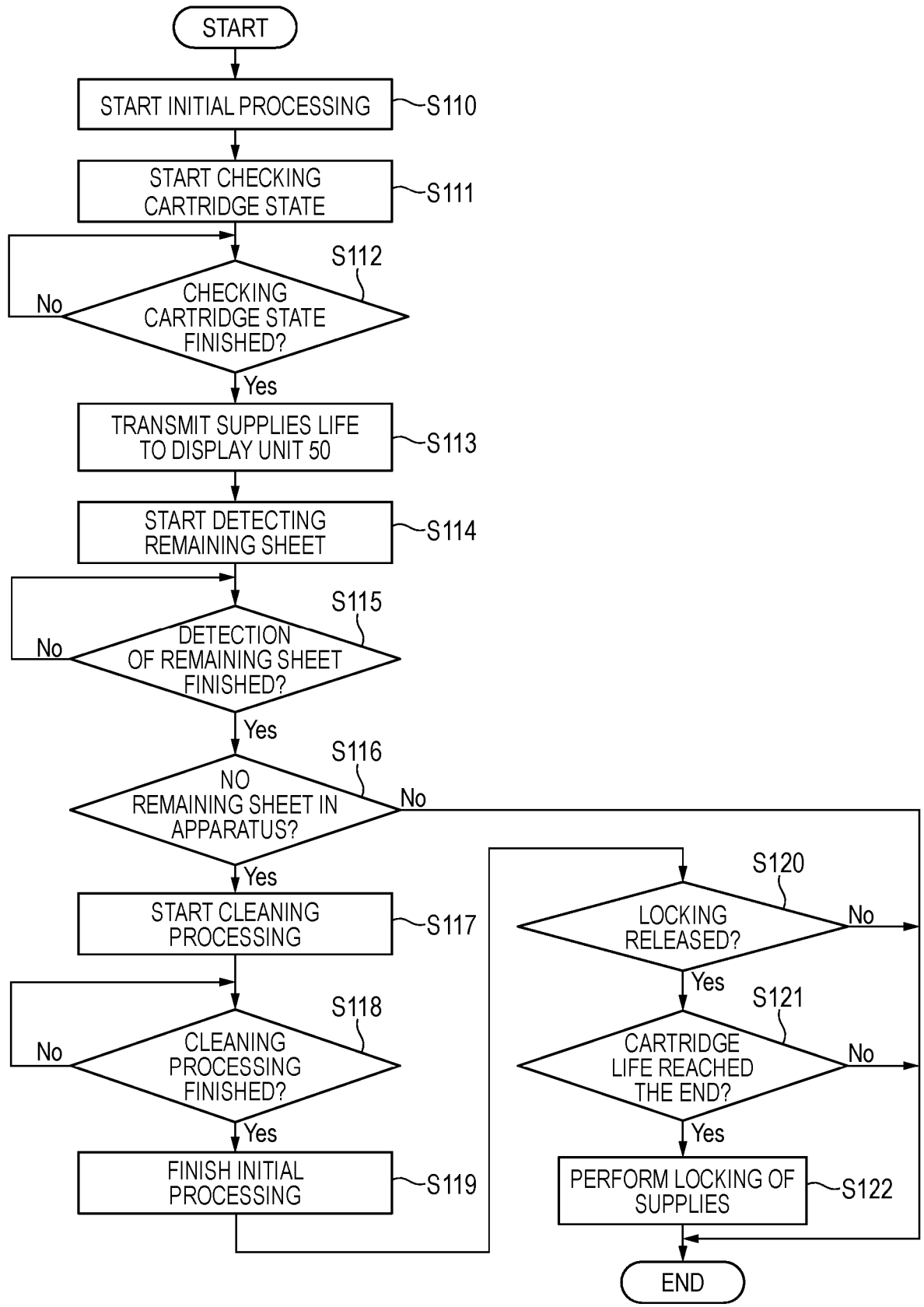
FIG. 6 is a flowchart illustrating a determination process for locking in a first embodiment.

FIG. 6 will be described. FIG. 6 is a flowchart illustrating a process initiated by the control unit 61 when the power is turned on (hereinafter referred to as power-on) or when the door 40 is closed (hereinafter referred to as door-closing). The flowchart in FIG. 6 includes starting initial processing upon power-on or upon door-closing and locking a cartridge 12 by the lock condition determination control unit 230 upon completion of the initial processing.

At S110, the control unit 61 starts the initial processing through the initial control unit 208. At S111, the control unit 61 starts the processing of checking the state of each cartridge 12 (hereinafter referred to as cartridge state checking processing) through the initial control unit 208. The cartridge state checking processing performed by the initial control unit 208 is the processing of reading the information stored in the attribute information memory unit 70 or the life information memory unit 71 (see Table 1 or 2) and checking the state of the cartridge 12 based on the information read. At S112, the control unit 61 determines whether the cartridge state checking processing by the initial control unit 208 is finished. If it is determined that the processing is not finished, the control unit 61 returns the process to S112; if it is determined that the processing is finished, the control unit 61 advances the process to S113. At S113, the control unit 61 displays the life information (the supplies life information) about the cartridge 12 checked at S111 on the display unit 50, thereby notifying the user of the life information.

At S114, the control unit 61 starts remaining sheet detection processing through the initial control unit 208. Here, the remaining sheet detection processing is the processing of rotating the rollers located on the conveyance path for a certain time period in order to check for any sheets remaining in the apparatus. While the rollers are being rotated, the initial control unit 208 monitors for (monitors the presence or absence of) the sheets 21 remaining on the conveyance path (hereinafter referred to as remaining sheets) with at least one sensor (not shown) located on the conveyance path. The remaining sheet detection processing also includes the processing of ejecting, by the initial control unit 208, any remaining sheet detected by the sensor from the apparatus by driving at least one roller located on the conveyance path for conveying the sheets 21.

At S115, the control unit 61 determines whether the remaining sheet detection processing by the initial control unit 208 is finished. If it is determined that the processing is not finished, the control unit 61 returns the process to S115; if it is determined that the processing is finished, the control unit 61 advances the process to S116. At S116, the control unit 61 determines whether no sheets remain in the apparatus according to the remaining sheet detection processing performed at S114. If it is determined at S116 that no sheets remain in the apparatus, the control unit 61 advances the process to S117; if it is determined that a sheet remains in the apparatus, the control unit 61 terminates the process. If the control unit 61 determines that a sheet remains in the apparatus, the control unit 61 may notify the user that a sheet remains in the apparatus (i.e., a paper jam) by, e.g., displaying the fact on the display unit 50, and then terminate the process.

At S117, the control unit 61 starts cleaning processing through the initial control unit 208. Here, the cleaning processing refers to the following processing. First, the intermediate transfer belt 17 and the photosensitive drum 13 are driven to apply voltage of the polarity opposite to the voltage used in transferring a toner image from the photosensitive drum 13 onto the intermediate transfer belt 17. This causes the toner remaining on the intermediate transfer belt 17 to be transferred onto the photosensitive drum 13 (hereinafter referred to as reverse transfer). Then, the reverse-transferred toner on the photosensitive drum 13 is put in a discarded-toner container by the drum cleaner 14. At S118, the control unit 61 determines whether the cleaning processing by the initial control unit 208 is finished. If it is determined that the cleaning processing is not finished, the control unit 61 returns the process to S118; if it is determined that the cleaning processing is finished, the control unit 61 advances the process to S119. At S119, the control unit 61 terminates the initial processing by the initial control unit 208.

At S120, the control unit 61, through the lock control unit 210, reads the information stored in the supplies information memory unit 72 ("lock state" in Table 3) and determines whether the lock on the consumable item (here, the cartridge 12) is released based on the information read. If it is determined at S120 that the lock is not released i.e., the lock is set (locked), the control unit 61 terminates the process. If it is determined at S120 that the lock is released, the control unit 61 advances the process to S121. At S121, through the lock control unit 210, the control unit 61 determines whether the consumable item (the cartridge 12) has yet to reach the life end based on the information stored in the supplies information memory unit 72 ("shortest life information" in Table 3). Here, since the cartridge state checking processing is already finished at the end of the initial processing, the information stored in the supplies information memory unit 72 is already updated. If it is determined at S121 that the consumable item (the cartridge 12) has reached the life end, the control unit 61 terminates the process while keeping the cartridge 12 unlocked. If it is determined at S121 that the consumable item (the cartridge 12) has not reached the life end, the control unit 61 advances the process to S122. At S122, the control unit 61 locks the consumable item (the cartridge 12) through the lock control unit 210. In the first embodiment, for the cartridge 12 in the unlocked state when the door is closed, the cartridge 12 is not locked if the cartridge 12 has reached the life end, i.e., if the replacement operation has not been completed.

As described above, the control unit 61 performs the initial processing started upon power-on or upon door-closing, and determines whether to set the lock upon completion of the initial processing. In this manner, the control unit 61 can determine that the operation of replacing the cartridge 12 at the life end has been completed. If the door 40 is closed even though the replacement operation is not completed, the control unit 61 can keep the cartridge 12 unlocked.

Although the initial processing in the above-described first embodiment includes performing the cartridge state checking processing, the remaining sheet detection processing, and the cleaning processing, this is not limiting. For example, the initial processing may include performing the processing of pulling off a cartridge seal. The processing of pulling off a cartridge seal is the processing of removing a seal member attached to a new cartridge that replaces the old cartridge. Here, the seal member is a member for sealing the cartridge to prevent the toner in the cartridge from spilling out during shipment.

Although the flowchart in FIG. 6 describes control such that the steps of the initial processing are sequentially performed, this is not limiting. The steps of the initial processing may be performed in parallel. For example, processing such as the remaining sheet detection processing may be performed while the cartridge state checking processing is being performed. In this case, if the cartridge state checking processing is still being performed when the other steps of the initial processing are finished, the cartridge 12 is controlled not to be locked until the entire initial processing is finished.

Although the lock is set after the initial processing is finished (S119 to S122 in FIG. 6) in the first embodiment, the determination to set the lock may also be made at the following times. That is, this determination may be made during the initial processing, or after a lapse of a predetermined time period from the finish of the initial processing (for example, before moving to power-saving state). It is to be noted that the initial processing here refers to the steps of the initial processing other than the cartridge state checking processing; the cartridge 12 is controlled not to be locked at least until the cartridge state checking processing is finished.

Although the locking mechanism in the color image forming apparatus with multiple cartridges has been described in the first embodiment, similar control is also possible for a monochrome image forming apparatus with only one cartridge. Thus, according to the first embodiment, usability related to the locking mechanism for the replaceable replacement unit(s) can be improved. Although the first embodiment has been described with reference to the configurations shown in FIGS. 2, 3A and 3B, similar control is also possible with the configurations in FIGS. 7, 8A and 8B in a second embodiment and the configuration in FIG. 11 in a third embodiment to be described later.

Thus, according to the first embodiment, usability in replacing supplies can be improved.

Second Embodiment

In a second embodiment, the apparatus has doors for individually accessing the respective cartridges 12Y, 12M, 12C and 12K. Each door includes a door locking mechanism that restricts the removal of the corresponding cartridge 12, and further includes a sensor that detects the opening/closing of the door. The same components as described in the first embodiment will be given the same reference numerals and not be described.

[Configurations of Cartridges and Doors]

The insertion configuration of the cartridges 12 and the door configuration in the second embodiment will be described with reference to FIGS. 7, 8A and 8B. FIG. 7 is a schematic perspective view of a printer, which is the image forming apparatus in which the cartridges 12 can be inserted into and removed from the body 1 of the image forming apparatus. In the second embodiment, a door is provided for each cartridge 12. FIG. 7 shows doors 45Y, 45M, 45C and 45K provided for the respective cartridges 12, among which the door 45Y is open and the doors 45M, 45C and 45K are closed. Locking pins 47, which are regulation units, restrict the movement of the respective doors 45 toward the open state. Locking members 51, which are also regulation units, are paired with the respective locking pins 47 to hold the doors 45 closed.

Figure 8A:
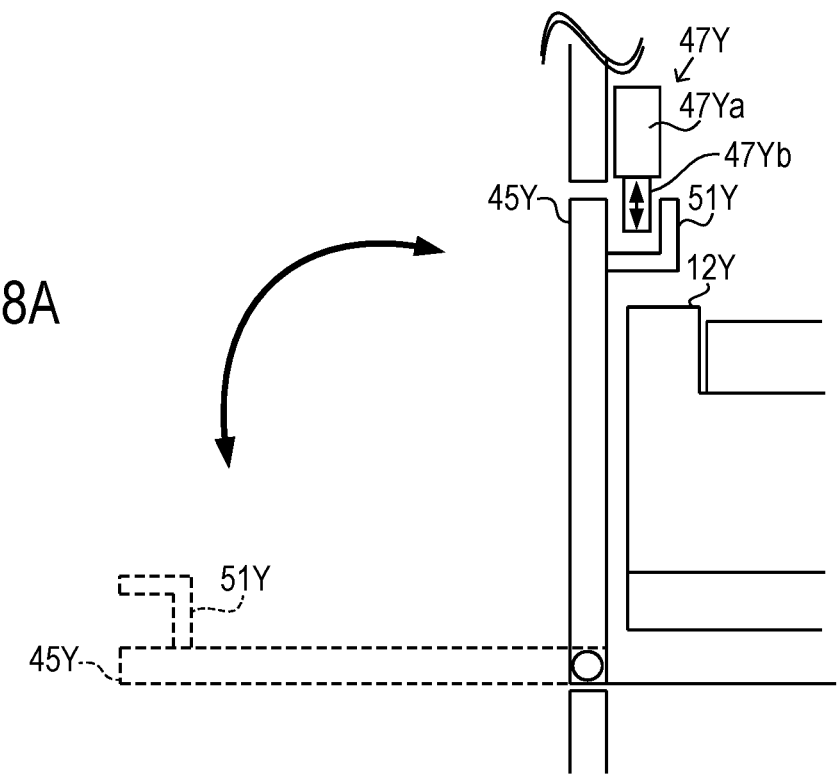
FIG. 8A is a cross-sectional view illustrating a door lock configuration in the second embodiment.

As illustrated in FIG. 8A, when the locking pin 47Y is in the protruding state, the locking pin 47Y engages with the locking member 51Y to hold the door 45Y closed. The door 45Y held closed inhibits the user from removing the cartridge 12Y. The locking pins 47 are controlled by a control unit 81 to be described later (more specifically, a lock control unit 211) to either allow the respective doors 45 to be open (dashed lines) (hereinafter referred to as "allowed to be open") or hold the respective doors 45 closed (solid lines) (hereinafter referred to as "held closed").

An open/close sensor 48Y, which is a second detection unit, detects the open/closed state of the door 45Y. A member 49Y is a member for the open/close sensor 48Y to detect the open/closed state of the door 45Y. In FIG. 7, open/close sensors 48M, 48C and 48K, which are second detection units, and members 49M, 49C and 49K are not shown because the doors 45M, 45C and 45K are closed. Operation members 46M, 46C and 46K are members for operating the respective doors 45M, 45C and 45K. An operation member 46Y is not shown because the door 45Y is open.

FIG. 8A is a cross-sectional view at the position of the locking pin 47Y, illustrating the cartridge 12Y and the door locking configuration of the door 45Y. The locking pin 47Y includes a locking pin body 47Ya and a member 47Yb that is retracted inside or protrudes outside the locking pin body 47Ya. With the door 45Y closed, if the member 47Yb of the locking pin 47Y is lowered to protrude, the member 47Yb engages with the locking member MY The engagement of the member 47Yb of the locking pin 47Y with the locking member MY holds the door 45Y closed (held closed). In contrast, if the member 47Yb of the locking pin 47Y is lifted to retract into the locking pin body 47Ya, the door 45Y is unlocked and allowed to be open, so that the door 45Y can be opened by operating the operation member 46Y.

[Detection of Opening/Closing of Door]

Figure 8B:
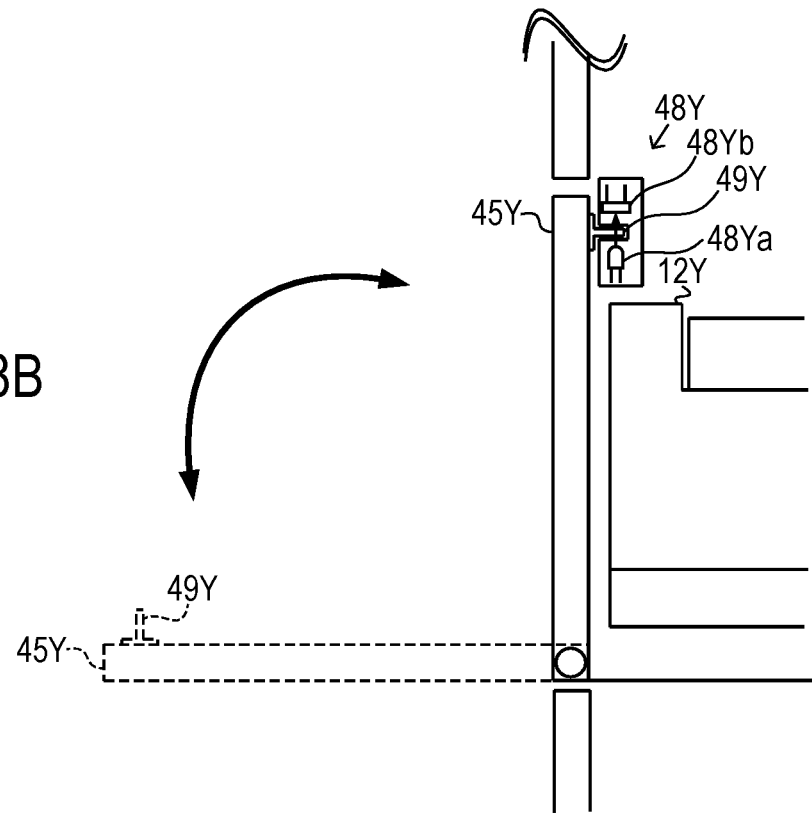
FIG. 8B is a cross-sectional view illustrating detection of opening/closing of the door.

FIG. 8B is a cross-sectional view at the position of the open/close sensor 48Y, illustrating the cartridge 12Y and the configuration of detection of the opening/closing of the door 45Y. The open/close sensor 48Y may be implemented with, for example, a photointerrupter. For example, the open/close sensor 48Y includes a light emission unit 48Ya that emits light and a light reception unit 48Yb that receives the light emitted from the light emission unit 48Ya. When the member 49Y is inserted in the open/close sensor 48Y, the light emitted from the light emission unit 48Ya is blocked by the member 49Y and therefore not received by the light reception unit 48Yb. Accordingly, the open/close sensor 48Y detects that the door 45Y is closed. In contrast, when the member 49Y is not inserted in the open/close sensor 48Y, the light emitted from the light emission unit 48Ya is received by the light reception unit 48Yb without being blocked by the member 49Y. Accordingly, the open/close sensor 48Y detects that the door 45Y is open. The information detected by the open/close sensor 48Y (the detection result) is provided to the lock control unit 211 in the control unit 81 to be described later.

[Control Configuration]

Figure 9:
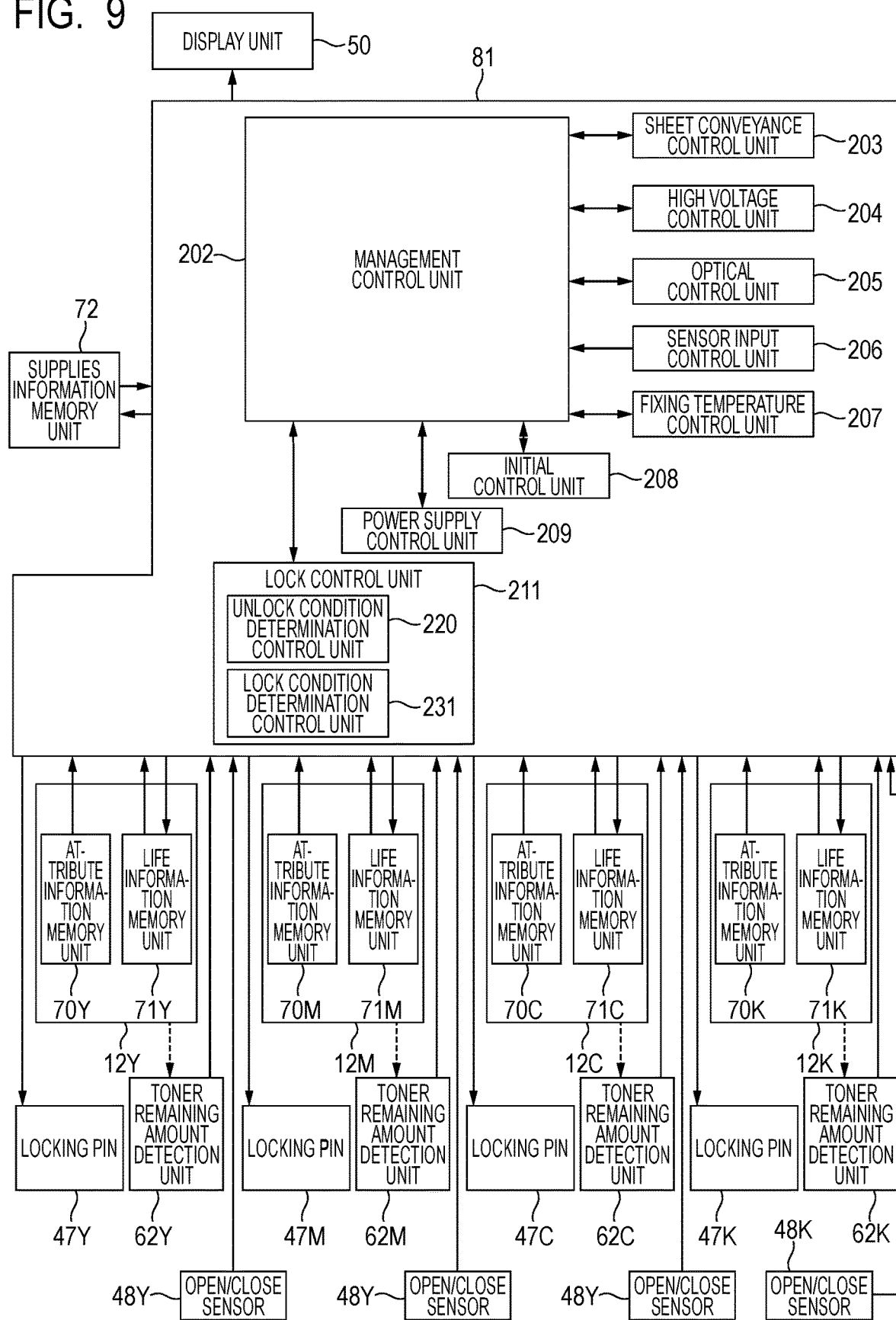
FIG. 9 is a block diagram illustrating a control configuration in the second embodiment.

FIG. 9 is a block diagram of the control configuration in the second embodiment. The control unit 81 includes components such as a CPU and is responsible for management of information about the cartridges 12 and management of the lives of the cartridges 12, as well as output control for the door locking mechanism, and detection with the open/close sensors 48. The control unit 81 includes the lock control unit 211, which has the unlock condition determination control unit 220 and a lock condition determination control unit 231. The control unit 81 performs control of the locking pins 47Y, 47M, 47C and 47K (protrusion and retraction of the member 47Yb) with the lock condition determination control unit 231 and the unlock condition determination control unit 220, and detection with the open/close sensors 48Y, 48M, 48C and 48K. Other components are similar to the components in the first embodiment; the same components are given the same reference signs and will not be described. The unlocking processing by the unlock condition determination control unit 220 has been described with reference to FIG. 5 in the first embodiment and therefore will not be described.

[Process of Determining Whether to Set Locking Mechanism Upon Power-on or Upon Door-Closing]

Figure 10:
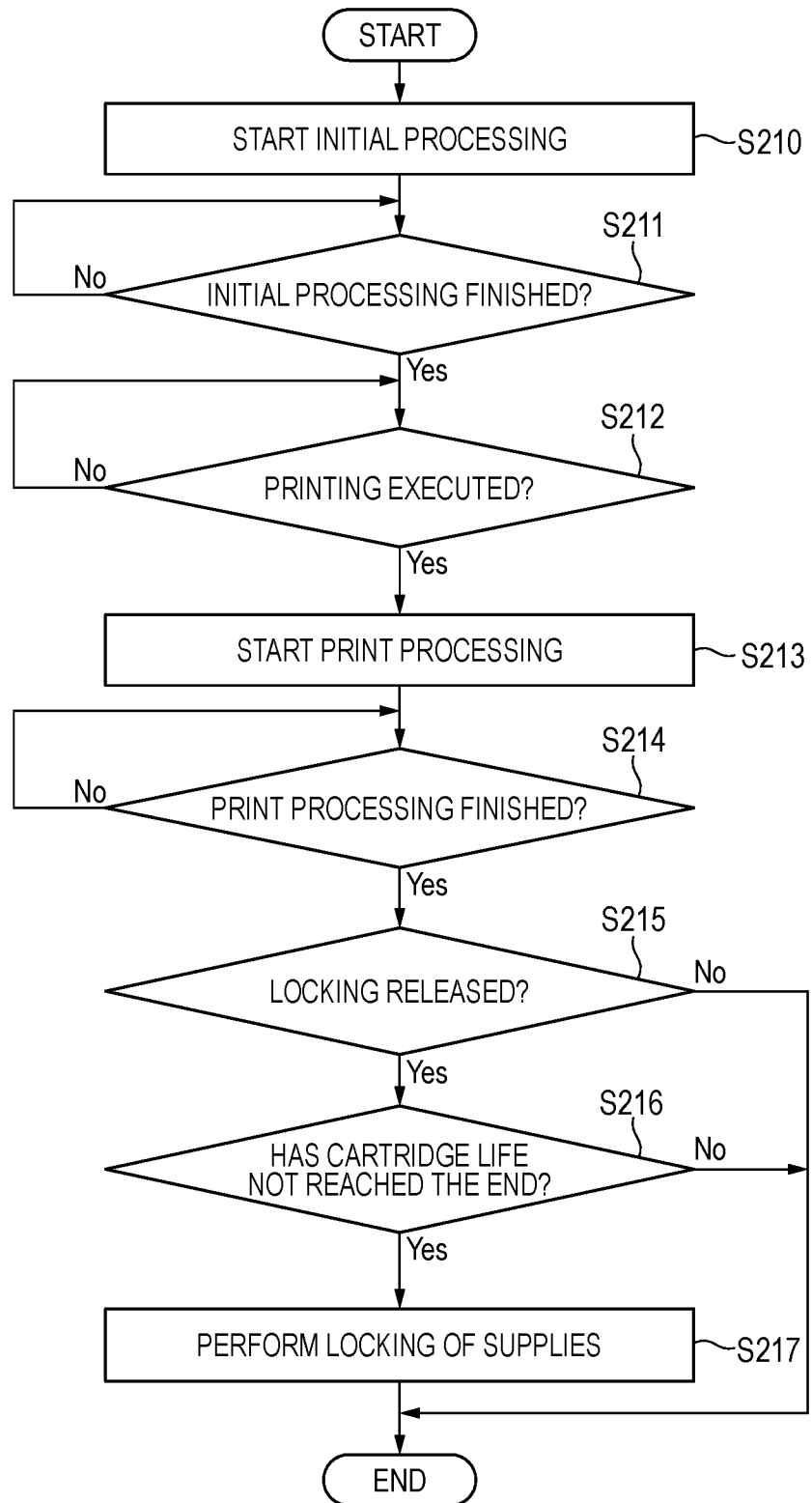
FIG. 10 is a flowchart illustrating a determination process for locking in a second embodiment.

In the second embodiment, an example will be described with reference to a flowchart in FIG. 10 in which the lock condition determination control unit 231 determines whether to set the lock after normal completion of print operations (print processing) (hereinafter referred to as printing) executed following the initial processing. Again, the process in FIG. 10 is performed by the control unit 81 upon power-on or upon door-closing. Processing at S210 is the same as the processing at S110 in FIG. 6 and therefore will not be described. Processing at S211 represents the processing at S111 to S119 in FIG. 6 as a single determination step and therefore will not be described.

At S212, the control unit 81 determines whether printing is executed. If it is determined at S212 that printing is not executed, the control unit 81 returns the process to S212; if it is determined that printing is executed, the control unit 81 advances the process to S213. At S213, the control unit 81 starts print processing. At S214, the control unit 81 determines whether the print processing is finished. If it is determined at S214 that the print processing is not finished, the control unit 81 returns the process to S214; if it is determined that the print processing is finished, the control unit 81 advances the process to S215. Processing at S215 to S217 is the same as the processing at S120 to S122 in FIG. 6 and therefore will not be described. Again, in the second embodiment, for the door 45 in the unlocked state when the door is closed, the door 45 will not be locked if the cartridge 12 is at the life end, i.e., if the replacement operation has not been completed.

As described above, in the second embodiment, printing is executed after the initial processing, and whether to lock the door 45 is determined after the completion of the printing. In this manner, the control unit 81 can determine that the operation of replacing the cartridge 12 at the life end has been completed.

Although whether to lock the supplies is determined after the printing is finished in the second embodiment, this determination may also be made at the following times. For example, this determination may be made at the start of the printing, during the printing, or after a lapse of a predetermined time period from the finish of the printing (for example, before moving to power-saving state). The control unit 81 (more specifically, the lock condition determination control unit 231 in the lock control unit 211) may also make this determination if, after the printing is finished, the ejected sheet sensor 53 detects that an ejected sheet 21 has been removed. Although the second embodiment has been described with reference to the configurations in FIGS. 7, 8A and 8B, similar control is also possible with the configurations in FIGS. 2, 3A and 3B in the first embodiment and the configuration in FIG. 11 in the third embodiment to be described later.

Thus, according to the second embodiment, usability in replacing supplies can be improved.

Third Embodiment

In a third embodiment, operations will be described in a configuration in which the apparatus has a single door common to the cartridges 12Y, 12M, 12C and 12K; the door includes a locking mechanism that restricts the removal of the cartridges, and further a sensor that detects the opening/closing of the door. The same components as described in the first and second embodiments will be given the same reference numerals and not be described.

[Door Configuration]

Figure 11:
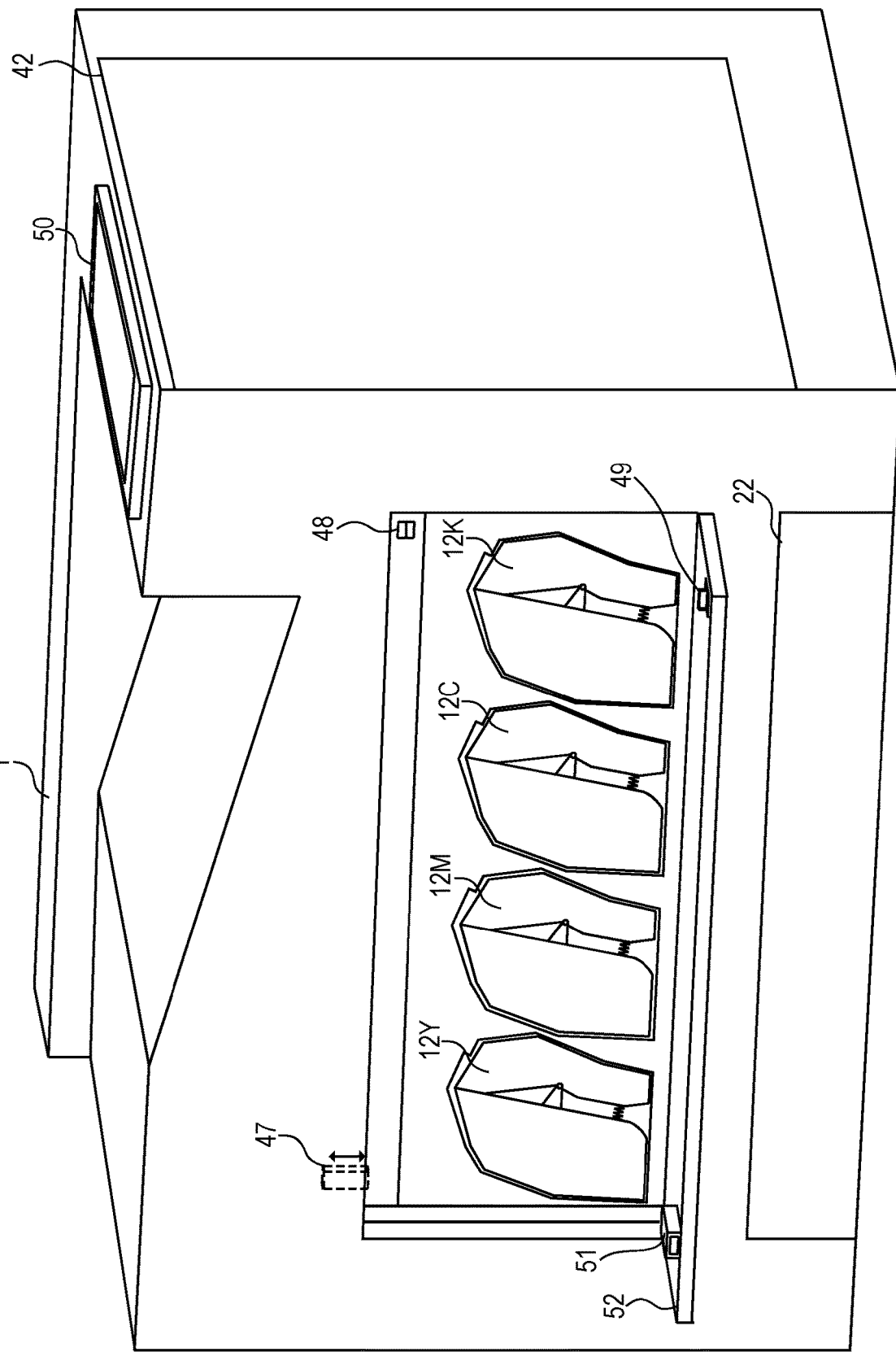
FIG. 11 is a perspective view illustrating a door lock configuration when a door is open in the third embodiment.

The insertion configuration of the cartridges 12 and the door configuration in the third embodiment will be described with reference to FIG. 11. FIG. 11 is a schematic perspective view of a printer, which is the image forming apparatus in which the cartridges 12 can be inserted into and removed from the body 1 of the image forming apparatus. FIG. 11 shows a single door 52 provided for all cartridges 12, which is open. A locking pin 47 restricts the movement of the door 52 toward the open state. A locking member 51 is paired with the locking pin 47 to hold the door 52 closed. When the locking pin 47 is in the protruding state, the locking pin 47 engages with the locking member 51 to hold the door 52 closed. The door 52 held closed inhibits the user from removing the cartridges 12Y, 12M, 12C and 12K. The locking pin 47 is controlled by a control unit 91 (more specifically, a lock control unit 212) to either allow the door 52 to be open or hold the door 52 closed.

An open/close sensor 48, which is a first detection unit, detects the open/closed state of the door 52. A member 49 is a member for the open/close sensor 48 to detect the open/closed state of the door 52. The cartridges 12 can be removed when the door 52 is in the state shown in FIG. 11. In the third embodiment, release of the locking mechanism of the door 52 enables replacement of the cartridges 12. Therefore, the door 52 is allowed to be open if at least one of the cartridges 12 reaches the life end. The door lock configuration and the open/close sensor configuration are the same as in the second embodiment and will not be described.

[Control Configuration]

Figure 12:
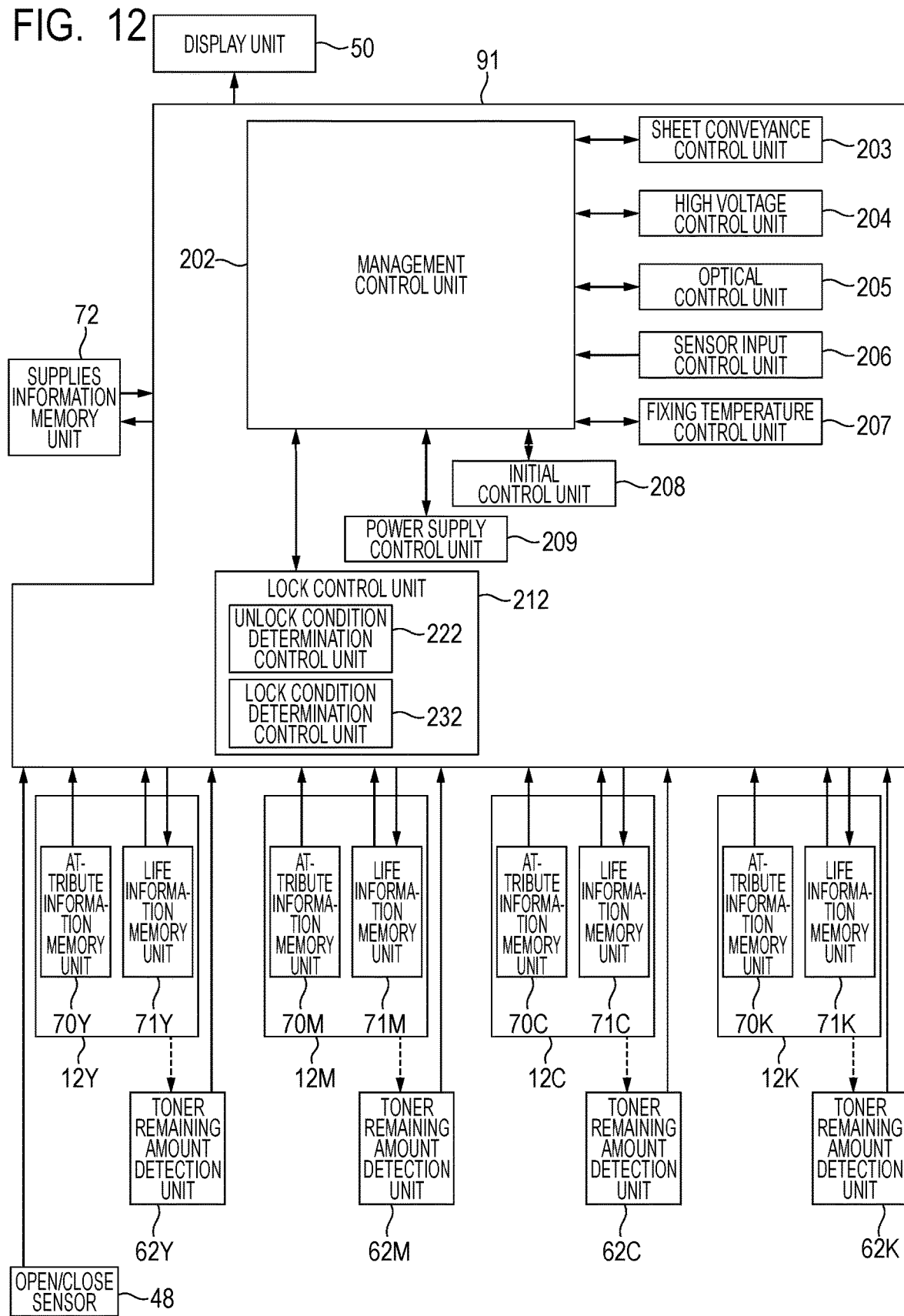
FIG. 12 is a block diagram illustrating a control configuration in the third embodiment.

FIG. 12 is a block diagram of the control configuration in the third embodiment. The control unit 91 includes components such as a CPU and is responsible for management of information about the cartridges 12 and management of the lives of the cartridges 12, as well as output control for the door locking mechanism of the door 52, and detection with the open/close sensor 48. The control unit 91 includes a lock control unit 212, which has an unlock condition determination control unit 222 and a lock condition determination control unit 232. The lock control unit 212 in the control unit 91 controls output for the locking pins 47 and detects the state of the door 52 with the open/close sensor 48. Other components are similar to the components in the first and second embodiments; the same components are given the same reference signs and will not be described.

[Locking Mechanism]

Figure 13:
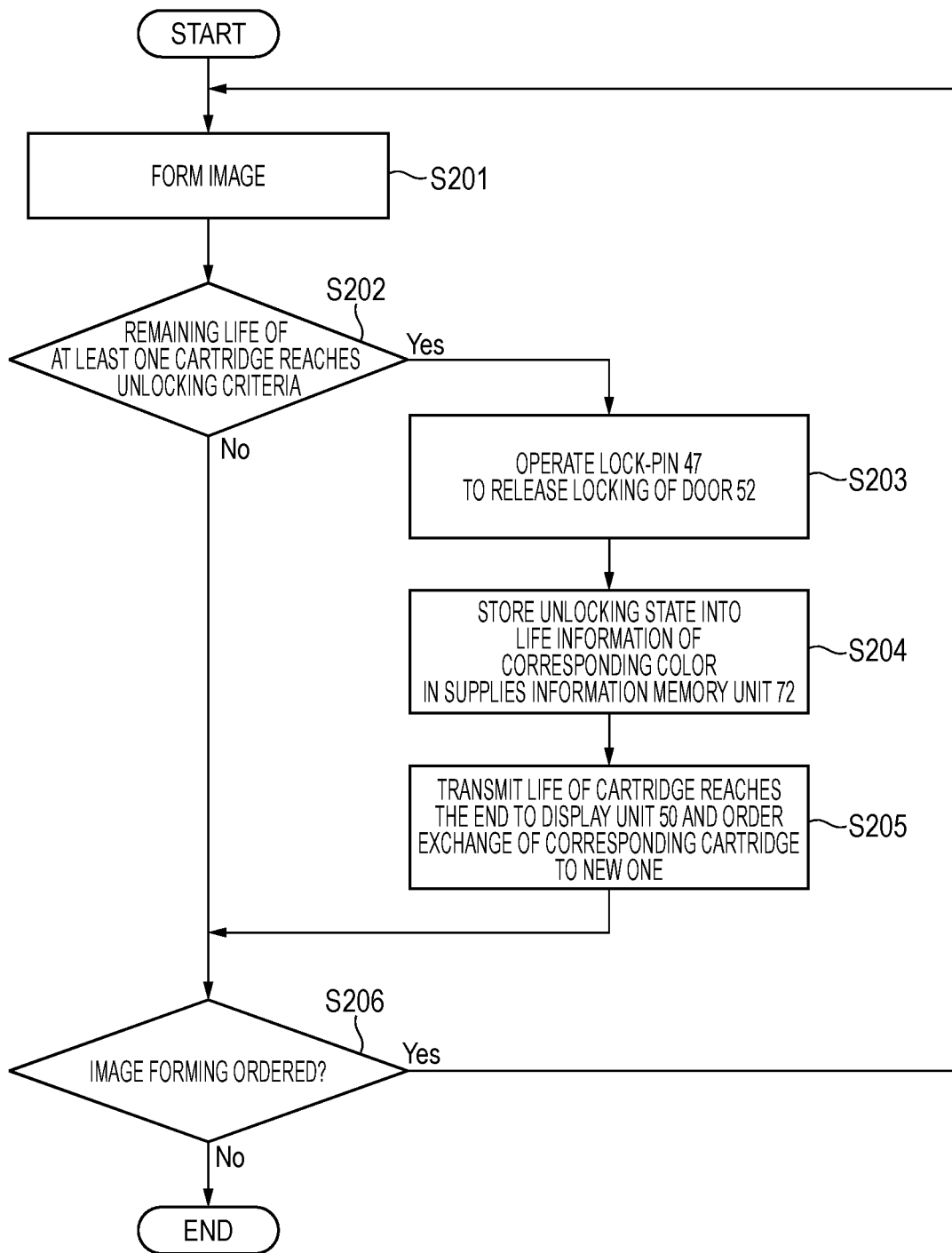
FIG. 13 is a flowchart illustrating an unlocking process in the third embodiment.

The method of release of the locking mechanism for the cartridges 12 by the control unit 91 will now be described with reference to FIG. 13. The flowchart in FIG. 13 illustrates a locking mechanism releasing process in which the door 52 is unlocked by the unlock condition determination control unit 222 if the remaining amount of the toner in a cartridge 12 falls to or below a predetermined value during image forming.

Upon receiving an image forming designation, the control unit 91 starts the process beginning in S201. In S201, the control unit 91 forms an image. In S202, during or after the image forming, the control unit 91 determines by the lock control unit 212 whether or not the remaining life of at least one cartridge 12 reaches the value of the unlocking criterion for unlocking the door 52. If the control unit 91 determines in S202 that the remaining life reaches the criterion for unlocking the door 52, the control unit 91 advances the process to S203, while if the control unit 91 determines in S202 that the remaining life has not yet reach the criterion for unlocking the door 52, the control unit 91 advances the process to S206.

In S203, the control unit 91 operates the locking pin 47 by the lock control unit 212 to unlock the door 52. In S204, for the lock state of the cartridge 12 of the color determined by the lock control unit 212 as reaching the life end, the control unit 91 stores information indicating the unlocked state (for example, "unlocked") in Table 3 in the supplies information memory unit 72. In the third embodiment, the life information memory unit 71 of each cartridge 12 has an area for storing lock information, and the lock control unit 212 stores the unlocked state in the life information memory unit 71 of the cartridge 12 of the color reaching the life end. In S205, the control unit 91 provides, on the display unit 50, a notification of the life end of the cartridge 12 and a prompt to replace the cartridge 12 of the color reaching the life end with a new cartridge, and advances the process to S206. In S206, the control unit 91 determines whether or not a further image forming designation is received. If the control unit 91 determines in S206 that a further image forming designation is received, the control unit 91 returns the process to S201, if the control unit 91 determines in S206 that a further image forming designation has not yet received, the control unit 91 terminates the image forming operation.

[Process of Determining Whether to Set Locking Mechanism Upon Power-on or Upon Door-Closing]

Figure 14:
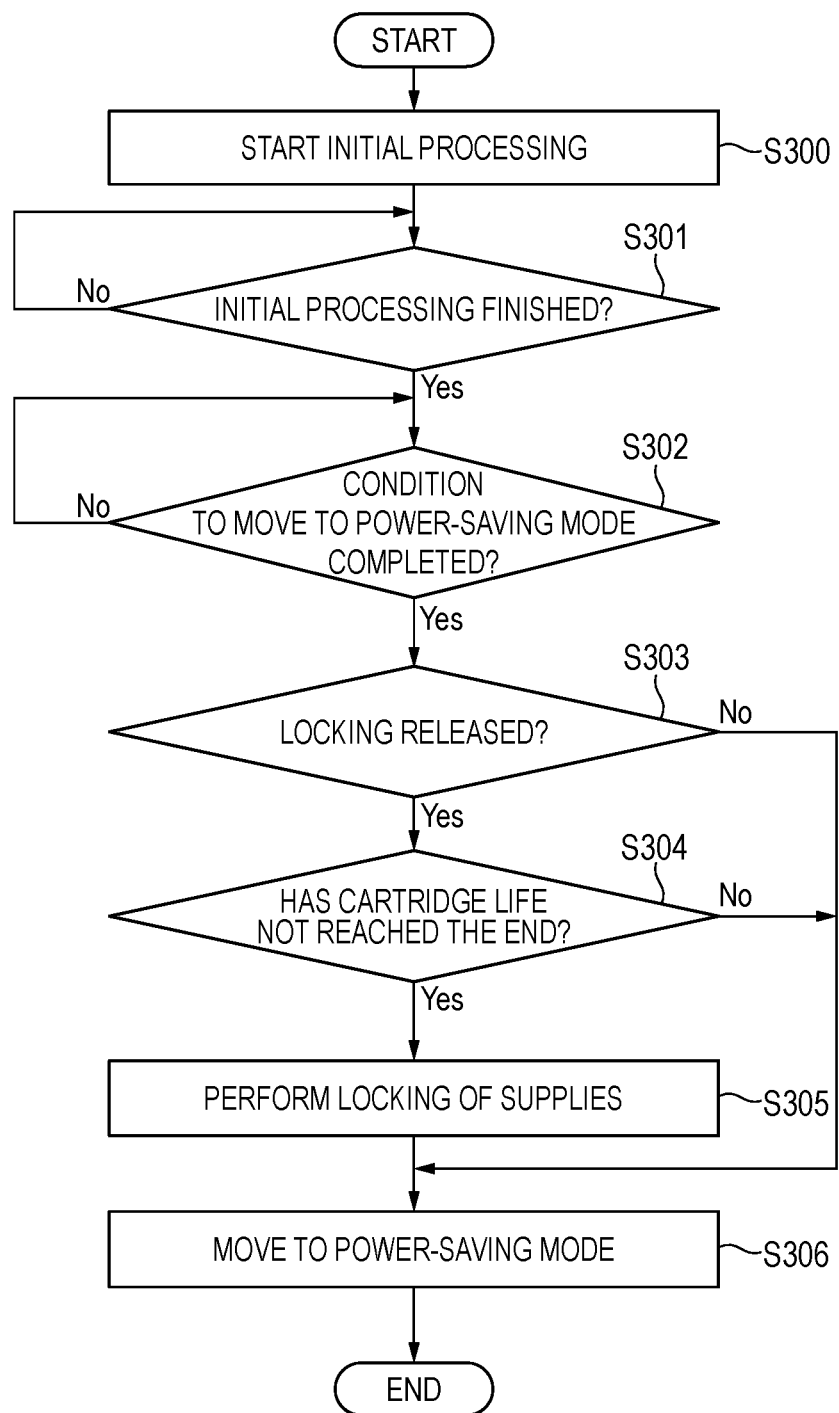
FIG. 14 is a flowchart illustrating a determination process for locking in a third embodiment.

In the third embodiment, an example will be described with reference to a flowchart in FIG. 14 in which the lock condition determination control unit 232 determines whether to set the lock when power-saving state (the power-saving state) is entered after the initial processing. In power-saving state, less power is consumed than in image forming. The image forming apparatus in the third embodiment can move to the stand-by state, in which the apparatus is on standby for performing image forming operations. After a lapse of a predetermined time period from moving to the stand-by state, the image forming apparatus in the third embodiment moves to power-saving state. Again, the process in FIG. 14 is performed by the control unit 91 upon power-on or upon door-closing. Processing at S300 is the same as the processing at S110 in FIG. 6 and therefore will not be described. Processing at S301 represents the processing at S111 to S119 in FIG. 6 as a single determination step and therefore will not be described.

At S302, the control unit 91 determines whether a condition for moving to power-saving state is satisfied. In the third embodiment, for example, the condition for moving to power-saving state may be that the stand-by state (in which the apparatus is ready to start printing in response to receiving a print instruction) continues for one minute after the initial processing is finished. If it is determined at S302 that the condition for moving to power-saving state is not satisfied, for example that one minute has not been elapsed from the start of the stand-by state, the control unit 91 returns the process to S302. If it is determined at S302 that the condition for moving to power-saving state is satisfied, for example that one minute has been elapsed from the start of the stand-by state, the control unit 91 advances the process to S303. Processing at S303 to S305 is the same as the processing at S120 to S122 in FIG. 6 and therefore will not be described. Here, the process proceeds to S306 if the lock is set at S303 (No), if the cartridge 12 has reached the life end at S304 (No), or after the processing at S305.

At S306, the control unit 91 moves to power-saving state and terminates the process. Again, in the third embodiment, for the door 52 in the unlocked state when the door is closed, the door 52 will not be locked if the cartridge 12 is at the life end, i.e., if the replacement operation has not been completed.

As described above, in the third embodiment, whether to set the lock is determined when power-saving state is entered after the initial processing. In this manner, the control unit 91 can determine that the operation of replacing the cartridge 12 at the life end has been completed. Although whether to lock the supplies is determined when power-saving state is entered in the third embodiment, this determination may also be made at the following times. For example, this determination may be made in the process of moving to power-saving state, after a lapse of a predetermined time period from moving to power-saving state, or upon returning from power-saving state. Although the third embodiment has been described with reference to the configuration in FIG. 11, similar control is also possible with the configurations in FIGS. 2, 3A and 3B in the first embodiment and the configurations in FIGS. 7, 8A and 8B in the second embodiment.

Thus, according to the third embodiment, usability in replacing supplies can be improved.

Fourth Embodiment

In a fourth embodiment, an example will be described in which a confirmation screen for confirming whether the replacement operation has been completed is displayed on the display unit 50 (such as an operation panel) after the initial processing; in response to the user confirming the completion of the replacement operation on the display unit 50, whether to set the lock is determined. The following description takes the control unit 61 in FIG. 4 as an exemplary control unit. The confirmation screen displayed on the display unit 50 may contain, for example, a message such as "Have you completed the replacement operation?" and a virtual button at a predetermined location on the screen indicating "Completed" (hereinafter referred to as a virtual button). After completing the replacement operation, the user touches (presses) the predetermined location, for example the virtual button "Completed," displayed on the display unit 50. The control unit 61 accordingly determines that the completion of the replacement operation is confirmed. Similar control is possible in any of the configurations in FIGS. 2, 3A and 3B in the first embodiment, the configurations in FIGS. 7, 8A and 8B in the second embodiment, and the configuration in FIG. 11 in the third embodiment.

[Process of Determining Whether to Set Locking Mechanism Upon Power-on or Upon Door-Closing]

Figure 15:
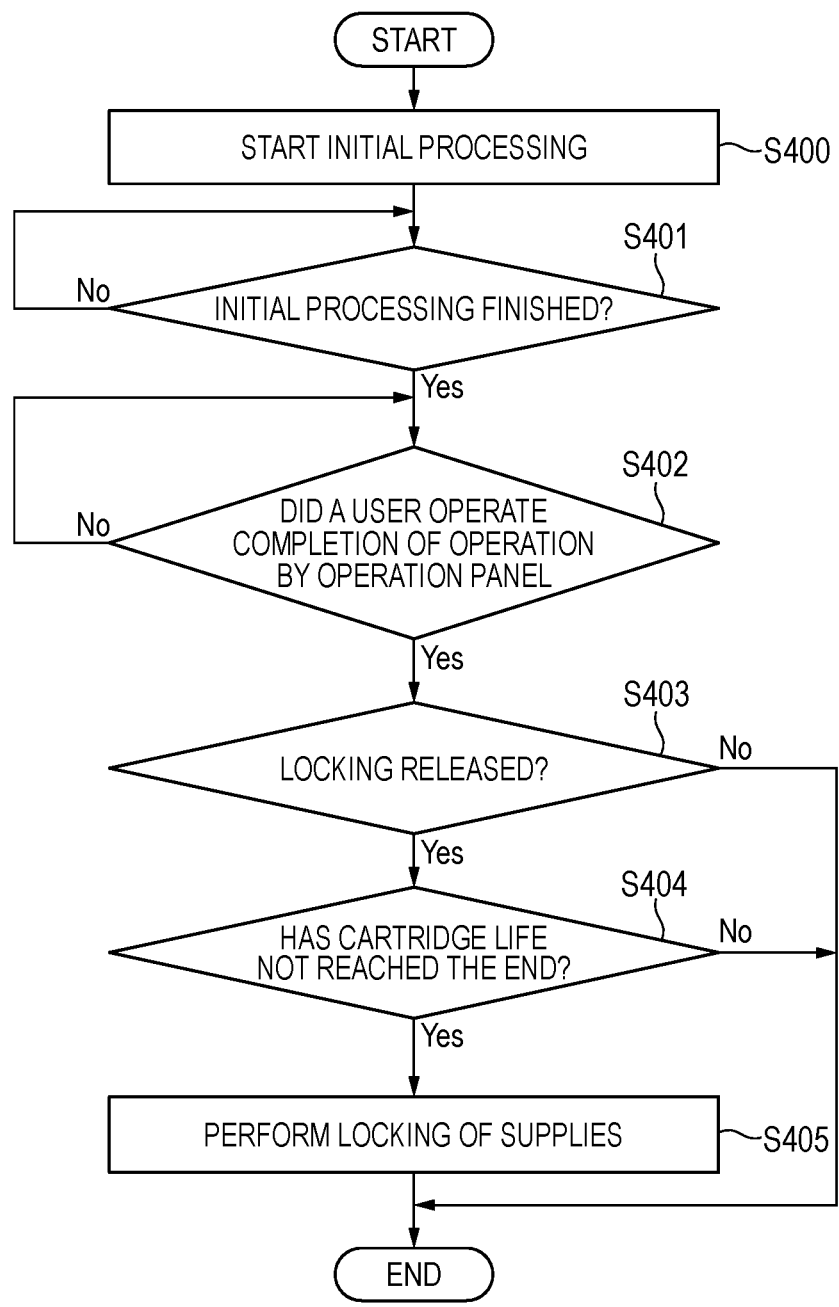
FIG. 15 is a flowchart illustrating a determination process for locking in a fourth embodiment.

Description will be given with reference to a flowchart in FIG. 15. Processing at S400 is the same as the processing at S110 in FIG. 6 and therefore will not be described. Processing at S401 represents the processing at S111 to S119 in FIG. 6 as a single determination step and therefore will not be described. At S402, the control unit 61 determines whether the user performs an operation corresponding to the completion of the replacement operation (for example, presses the above-described virtual button "Completed") on the display unit 50 (such as an operation panel). In the fourth embodiment, the control unit 61 displays the above-described confirmation screen on the display unit 50 upon completion of the initial processing. If the user presses the predetermined location on the confirmation screen, the control unit 61 determines the completion of the replacement operation.

If it is determined at S402 that the above-described operation is not performed, the control unit 61 returns the process to S402; if it is determined that the above-described operation is performed, the control unit 61 advances the process to S403. Processing at S403 to S405 is the same as the processing at S120 to S122 in FIG. 6 and therefore will not be described. Again, in the fourth embodiment, for the cartridge 12 in the unlocked state when the door is closed, the cartridge 12 will not be locked if the cartridge 12 is at the life end, i.e., if the replacement operation has not been completed.

As described above, in the fourth embodiment, the confirmation screen for confirming whether the replacement operation has been completed is displayed on the display unit 50. If the user performs an operation corresponding to the completion of the replacement operation on the display unit 50, whether to set the lock is determined. In this manner, the control unit 61 can determine that the operation of replacing the cartridge 12 at the life end has been completed.

Thus, according to the fourth embodiment, usability in replacing supplies can be improved.

Fifth Embodiment

A fifth embodiment will be described with reference to the configurations in FIGS. 2, 3A and 3B described in the first embodiment. FIGS. 2, 3A and 3B have been described in the first embodiment and therefore will not be described.

[Control Configuration]

Figure 16:
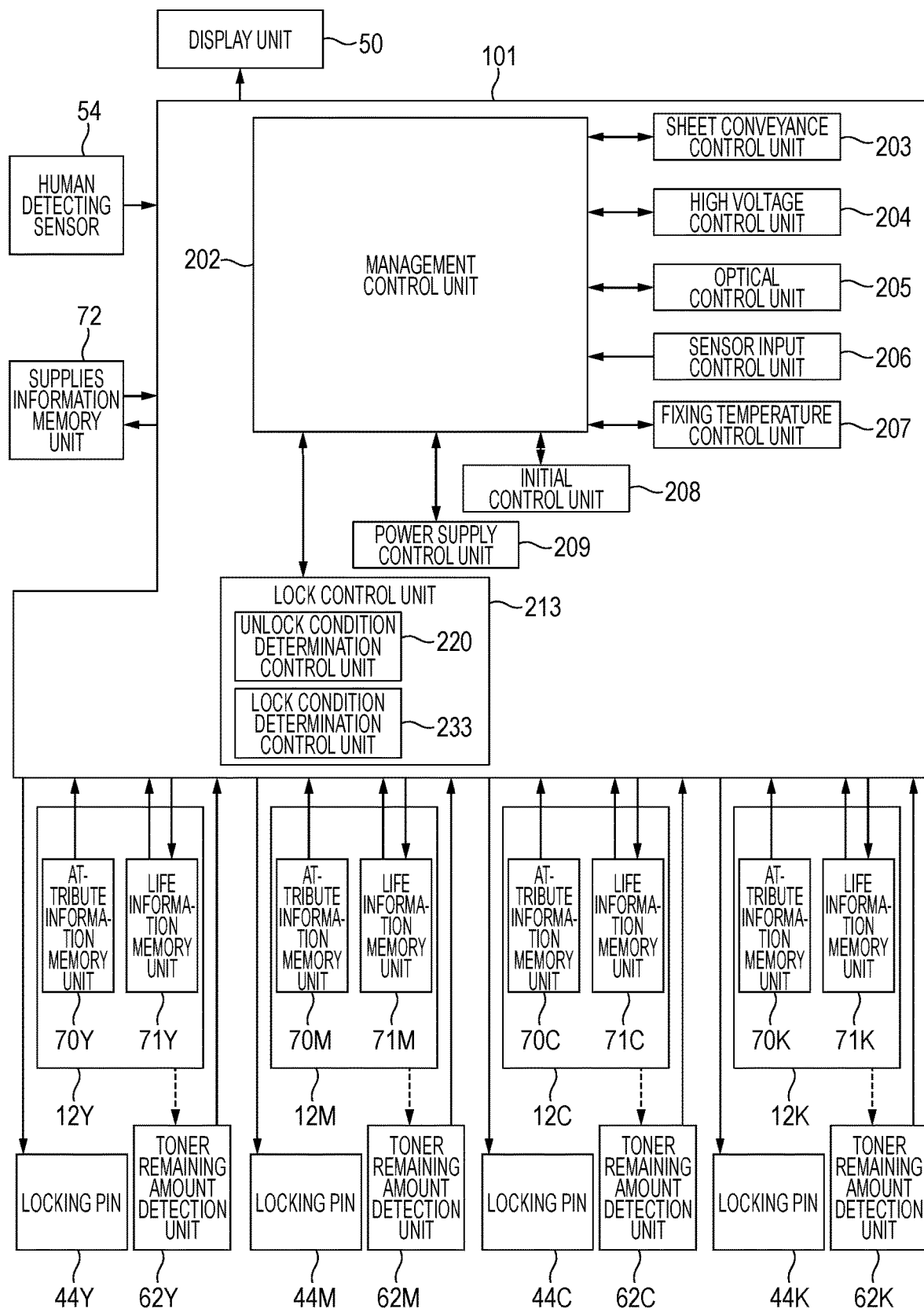
FIG. 16 is a block diagram illustrating a control configuration in a fifth embodiment.

FIG. 16 is a block diagram of a control configuration in the fifth embodiment. The control unit 101 includes components such as a CPU and is responsible for management of information about the cartridges 12, management of the lives of the cartridges 12, control of output for the locking mechanism of the door 40, and detection with a human detecting sensor 54. The control unit 101 includes a lock control unit 213, which has the unlock condition determination control unit 220 and a lock condition determination control unit 233. The lock control unit 213 in the control unit 101 controls output for the locking pins 44. The human detecting sensor 54 is located on the front side of the image forming apparatus, for example. The front side of the image forming apparatus refers to the side on which the door 40 is provided, for example. The human detecting sensor 54 detects whether a human is present near the image forming apparatus and outputs the detection result to the control unit 101. Other configurations are the same as in the first embodiment. The unlocking processing by the unlock condition determination control unit 220 has been described with reference to FIG. 5 in the first embodiment and therefore will not be described.

[Process of Determining Whether to Set Locking Mechanism Upon Power-on or Upon Door-Closing]

In the fifth embodiment, an example will be described with reference to FIG. 17 in which the control unit 101, through the lock condition determination control unit 233, determines whether to set the lock if the human detecting sensor 54 determines the absence of humans near the image forming apparatus after the initial processing. Again, the process in FIG. 17 is performed by the control unit 101 upon power-on or upon door-closing. Processing at S500 is the same as the processing at S110 in FIG. 6 and therefore will not be described. Processing at S501 represents the processing at S111 to S119 in FIG. 6 as a single determination step and therefore will not be described.

At S502, the control unit 101 determines whether a human is detected by the human detecting sensor 54. If it is determined at S502 that a human is detected by the human detecting sensor 54, the control unit 101 returns the process to S502; if it is determined that no human is detected, the control unit 101 advances the process to S503. In the determination at S502, the control unit 101 may determine that no human is detected if the human detecting sensor 54 detects no human continuously for a predetermined time period. Processing at S503 to S505 is the same as the processing at S120 to S122 in FIG. 6 and therefore will not be described. Again, in the fifth embodiment, for the door 40 in the unlocked state when the door is closed, the door 40 will not be locked if the cartridge 12 is at the life end, i.e., if the replacement operation has not been completed.

As described above, in the fifth embodiment, whether to set the lock is determined if the absence of humans near the image forming apparatus is determined based on the result of detection by the human detecting sensor 54 after the initial processing. In this manner, the control unit 101 can determine that the operation of replacing the cartridge 12 at the life end has been completed. Although the fifth embodiment has been described with reference to the configurations in FIGS. 2, 3A and 3B, similar control is also possible with the configurations in FIGS. 7, 8A and 8B in the second embodiment and the configuration in FIG. 11 in the third embodiment.

Thus, according to the fifth embodiment, usability in replacing supplies can be improved.

According to the present invention, usability in replacing supplies can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-202043, filed Oct. 26, 2018, which is hereby incorporated by reference herein in its entirety.

What is claimed is:

1. An image forming apparatus, comprising:
   a cartridge including an image forming member configured to form an image on a recording material, wherein the cartridge is detachably mounted to a main body of the image forming apparatus;
   a door configured to be in a closed state in which the cartridge is prevented from being accessed or in an open state in which the cartridge is to be accessed;
   a regulation unit configured to be in a regulating state in which the cartridge is prevented from being detached from the main body or in a release state in which the cartridge is to be detachable from the main body; and
   a processor configured to control an actuator for switching the regulation unit between the release state and the regulating state,
   wherein in a case where the cartridge is replaced with a new cartridge, the processor is configured to control the actuator so that the regulation unit stays in the release state at least until a predetermined timing and the regulation unit is switched from the release state to the regulation state after the predetermined timing, and
   wherein the predetermined timing is a timing when an initial processing for an image forming operation by the cartridge is completed after a power source is turned on or a state of the door becomes the closed state from the open state.

2. The image forming apparatus according to claim 1, wherein the processor is configured to perform the switching of the regulation unit after a print processing is finished following to the completion of the initial processing.

3. The image forming apparatus according to claim 1,
   wherein a state of the image forming apparatus is capable of shifting to a power-saving state whose power consumption is less than power consumption of image formation, and
   wherein the processor is configured to perform the switching of the regulation unit in a case where the state of the image forming apparatus is shifted to the power-saving state after the completion of the initial processing.

4. The image forming apparatus according to claim 3,
   wherein the image forming apparatus is capable of shifting to a stand-by state to perform image forming operations, and
   wherein the shift to the power-saving state is performed after a predetermined time period elapses from the shift to the stand-by state.

5. The image forming apparatus according to claim 1, comprising a display unit configured to display a screen operated according to completion of replacement of the cartridge,
   wherein the processor is configured to perform the switching of the regulation unit after the screen is operated in the display unit following completion of the initial processing.

6. The image forming apparatus according to claim 1, comprising a human detecting sensor configured to detect a human,
   wherein the processor is configured to perform the switching of the regulation unit after a human detecting sensor no longer detects a human following to the completion of the initial processing.

7. The image forming apparatus according to claim 1, wherein the initial processing comprises processing of detecting presence or absence of a recording material on a conveyance path, and cleaning processing.

8. The image forming apparatus according to claim 7, comprising:
   a first memory unit configured to store information about a state of the cartridge between the regulating state and the release state; and
   a second memory unit provided in the cartridge, the second memory unit configured to store information about the cartridge,
   wherein processing of detecting a state of the cartridge is processing of detecting the state of the cartridge based on information stored in the first memory unit and the second memory unit.

9. The image forming apparatus according to claim 8, wherein the information about the cartridge includes a serial number of the cartridge and information about an image forming apparatus into which the cartridge is to be mounted.

10. The image forming apparatus according to claim 8, wherein the image forming member includes at least a photosensitive member on which an electrostatic latent image is to be formed; and a development unit configured to develop the electrostatic latent image on the photosensitive member with toner to form a toner image.

11. The image forming apparatus according to claim 10, wherein the cartridge in an unused state is sealed with a seal member to contain the toner inside the cartridge, and wherein the initial processing includes processing of removing the seal member.

12. The image forming apparatus according to claim 10, wherein the information about the cartridge includes information about a color of the cartridge.

13. The image forming apparatus according to claim 10, comprising:

a remaining amount detection unit configured to detect a remaining amount of the toner; and a control unit configured to store, in the second memory unit, at least a total rotation time of rotation of the photosensitive member, a total rotation distance of the rotation of the photosensitive member, and the remaining amount of the toner detected by the remaining amount detection unit, after image forming operations are performed, wherein the control unit determines a life of the cartridge based on the total rotation time, the total rotation distance, and the remaining amount of the toner stored in the second memory unit.

14. The image forming apparatus according to claim 13, wherein in a case where it is determined that the cartridge is in the release state based on the information stored in the first memory unit, and the cartridge is not at a life end based on the information stored in the second memory unit, the control unit controls the regulation unit to switch the state of the regulation unit to the regulating state.

15. The image forming apparatus according to claim 14, wherein in a case where a remaining life of the cartridge becomes equal to or less than a predetermined value, the control unit controls the regulation unit to release the cartridge to replace the cartridge with a new one of the cartridge, and stores the state of the cartridge as in the release state in the first memory unit.

16. The image forming apparatus according to claim 13, wherein the regulation unit comprises a lock member and a locking pin, and wherein the control unit controls the regulating unit to be in the regulating state by bring the locking pin in a projecting state to move the lock member to a position where the cartridge is not able to be pulled out, and to be in a release state by bringing the locking pin in a retracting state to move the lock member to a position where the cartridge is able to be pulled out.

17. The image forming apparatus according to claim 16, wherein the cartridge includes a plurality of the cartridges, and wherein the lock member and the locking pin are provided for each of the plurality of the cartridges.

18. The image forming apparatus according to claim 13, wherein the regulation unit comprises a lock member and a locking pin configured to engage with the lock member in a projecting state and disengage from the lock member in a depressed state, and wherein the control unit controls the regulating unit to be in the regulating state by bring the locking pin in a projecting state to engage the locking pin with the lock member, and to be in a release state by bringing a locking pin in a retracting state to disengage the locking pin from the lock member.

19. The image forming apparatus according to claim 18, wherein the cartridge includes a plurality of the cartridges, wherein the door open-close unit includes a plurality of the doors, wherein the open-close unit is provided to each of the plurality of the cartridges, and wherein the lock member is provided to each of the plurality of the doors.

20. The image forming apparatus according to claim 18, wherein the cartridge includes a plurality of the cartridges, wherein the door is for accessing the plurality of the cartridges, and wherein the lock member is provided to the door.

* * * * *